US008503786B2

(12) United States Patent
Sata et al.

(10) Patent No.: US 8,503,786 B2
(45) Date of Patent: Aug. 6, 2013

(54) DOCUMENT IMAGE GENERATION APPARATUS, DOCUMENT IMAGE GENERATION METHOD AND RECORDING MEDIUM

(75) Inventors: Ichiko Sata, Osaka (JP); Takeshi Kutsumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 223 days.

(21) Appl. No.: 12/940,818

(22) Filed: Nov. 5, 2010

(65) Prior Publication Data

US 2011/0110599 A1 May 12, 2011

(30) Foreign Application Priority Data

Nov. 6, 2009 (JP) ................................ 2009-255373

(51) Int. Cl.
*G06K 9/00* (2006.01)
(52) U.S. Cl.
USPC .......................................................... 382/181
(58) Field of Classification Search
USPC ........................................ 382/181, 182, 189
See application file for complete search history.

(56) References Cited

U.S. PATENT DOCUMENTS

2008/0233980 A1* 9/2008 Englund et al. ............... 455/466
2010/0278453 A1* 11/2010 King ............................. 382/321

FOREIGN PATENT DOCUMENTS

| JP | 5-324720 A | 12/1993 |
| JP | 6-301713 A | 10/1994 |
| JP | 7-56924 A | 3/1995 |
| JP | 7-121539 A | 5/1995 |
| JP | 9-284446 A | 10/1997 |
| JP | 2006-268151 A | 10/2006 |
| JP | 2009-53838 A | 3/2009 |
| WO | WO 2008/031625 A2 | 3/2008 |

* cited by examiner

*Primary Examiner* — Edward Park
(74) *Attorney, Agent, or Firm* — Birch, Stewart, Kolasch & Birch, LLP

(57) ABSTRACT

A character is recognized from an original document image that is obtained, for example, by an image reading apparatus. And a natural language processing is performed on a document configured from the recognized characters. Thus, a translation (supplementary annotation) for a word or a phrase in the document is obtained. Then, a supplementary annotation added document image is generated with an original document image layer configured from an original document image on which a supplementary annotation text layer is superimposed. In the supplementary annotation text layer, the translation is placed at a position corresponding to a position in an interline space near the word or the phrase. Furthermore, in addition to a translation, an underline is placed for a discontinuous phrase.

16 Claims, 21 Drawing Sheets

X-ray crystallographic analysis also confirmed the molecular structure.

X-ray crystallographic
X線結晶解析
analysis also confirmed
　　　　　　　　確認する
the molecular structure.
分子の　　　構造

FIG. 4

| CHARACTER NUMBER | X COORDINATE FOR THE LEFT EDGE OF A CHARACTER | Y COORDINATE FOR THE TOP EDGE OF A CHARACTER | X COORDINATE FOR THE RIGHT EDGE OF A CHARACTER | Y COORDINATE FOR THE BOTTOM EDGE OF A CHARACTER | REGION NUMBER | IN-LINE POSITION INFORMATION | CHARACTER SIZE | RECOGNITION RESULT |
|---|---|---|---|---|---|---|---|---|
| 2617 | 37 | 290 | 43 | 284 | 5 | 1 | 7 | X |
| 2618 | 43 | 286 | 46 | 285 | 5 | 0 | 7 | - |
| 2619 | 46 | 288 | 49 | 283 | 5 | 0 | 7 | r |
| 2620 | 49 | 288 | 53 | 283 | 5 | 0 | 7 | a |
| 2621 | 54 | 288 | 57 | 282 | 5 | 0 | 7 | y |
| 2622 | 54 | 288 | 57 | 282 | 5 | 0 | 7 |  |
| 2623 | 62 | 288 | 65 | 283 | 5 | 0 | 7 | c |
| 2624 | 66 | 288 | 69 | 283 | 5 | 0 | 7 | r |
| 2625 | 69 | 287 | 73 | 282 | 5 | 0 | 7 | y |
| 2626 | 73 | 288 | 76 | 283 | 5 | 0 | 7 | s |
| 2627 | 77 | 288 | 79 | 283 | 5 | 0 | 7 | t |
| 2628 | 79 | 288 | 83 | 283 | 5 | 0 | 7 | a |
| 2629 | 83 | 289 | 85 | 283 | 5 | 0 | 7 | l |
| 2630 | 86 | 289 | 88 | 283 | 5 | 0 | 7 | l |
| 2631 | 89 | 287 | 92 | 283 | 5 | 0 | 7 | o |
| 2632 | 93 | 287 | 97 | 281 | 5 | 0 | 7 | g |
| 2633 | 98 | 287 | 100 | 283 | 5 | 0 | 7 | r |
| 2634 | 101 | 287 | 104 | 283 | 5 | 0 | 7 | a |
| 2635 | 105 | 287 | 109 | 281 | 5 | 0 | 7 | p |
| 2636 | 109 | 289 | 113 | 283 | 5 | 0 | 7 | h |
| 2637 | 113 | 289 | 115 | 283 | 5 | 0 | 7 | i |
| 2638 | 116 | 287 | 119 | 283 | 5 | 2 | 7 | c |
| 2639 | 37 | 278 | 41 | 284 | 5 | 1 | 7 | a |
| 2640 | 41 | 278 | 45 | 284 | 5 | 0 | 7 | n |
| 2641 | 46 | 278 | 49 | 284 | 5 | 0 | 7 | a |
| 2642 | 49 | 230 | 51 | 284 | 5 | 0 | 7 | l |
| 2643 | 52 | 278 | 56 | 284 | 5 | 0 | 7 | y |
| 2644 | 56 | 278 | 59 | 283 | 5 | 0 | 7 | s |
| 2645 | 60 | 279 | 61 | 283 | 5 | 0 | 7 | i |
| 2646 | 62 | 278 | 65 | 283 | 5 | 0 | 7 | s |

F I G. 5
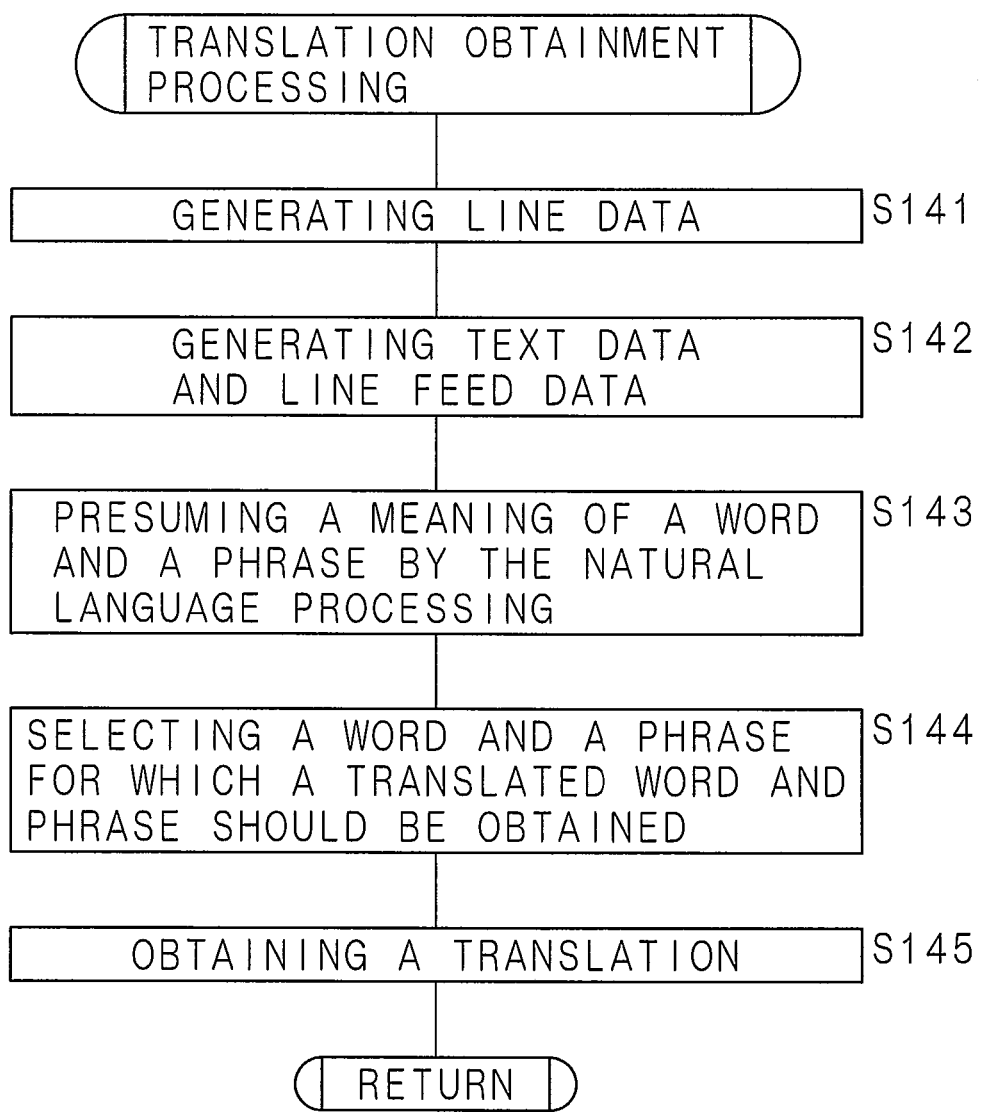

FIG. 6

| LINE NUMBER | LINE TEXT |
|---|---|
| 0 | X-ray crystallographic |
| 1 | analysis also confirmed |
| 2 | the molecular structure. |

FIG. 7A

X-ray crystallographic analysis also confirmed the molecular structure.

FIG. 7B

```
LINE      LINE FEED
NUMBER    POSITION
  0    :    22
  1    :    46
  2    :    71
```

FIG. 8

| WORD AND PHRASE | TRANSLATION |
|---|---|
| X-ray crystallographic analysis | X線結晶分析 |
| confirmed | 確認する |
| molecular | 分子の |
| structure | 構造 |

FIG. 13A would show an
〜を〜に示す

FIG. 13B would show an
〜を〜に示す

FIG. 14A color identified as vermilion
　　　色　　～が～であると認識する　橙

FIG. 14B color identified as green
　　　色　　～が～であると認識する　緑

FIG. 14C graphics identified as yellow
　　　図　　～が～であると認識する　黄色

FIG. 14D color identified as yellow
　　　色　～が～であると認識する　黄色

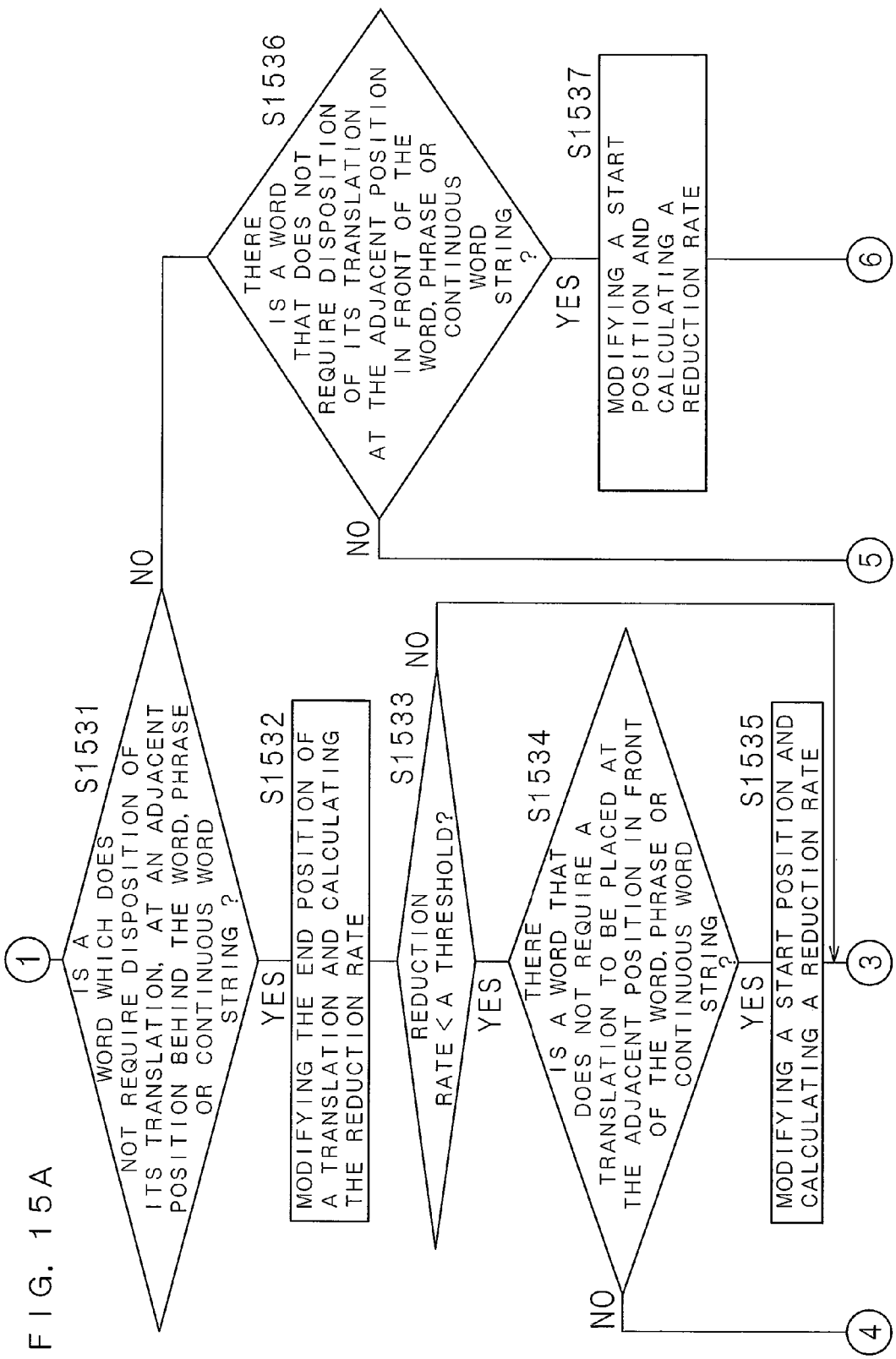

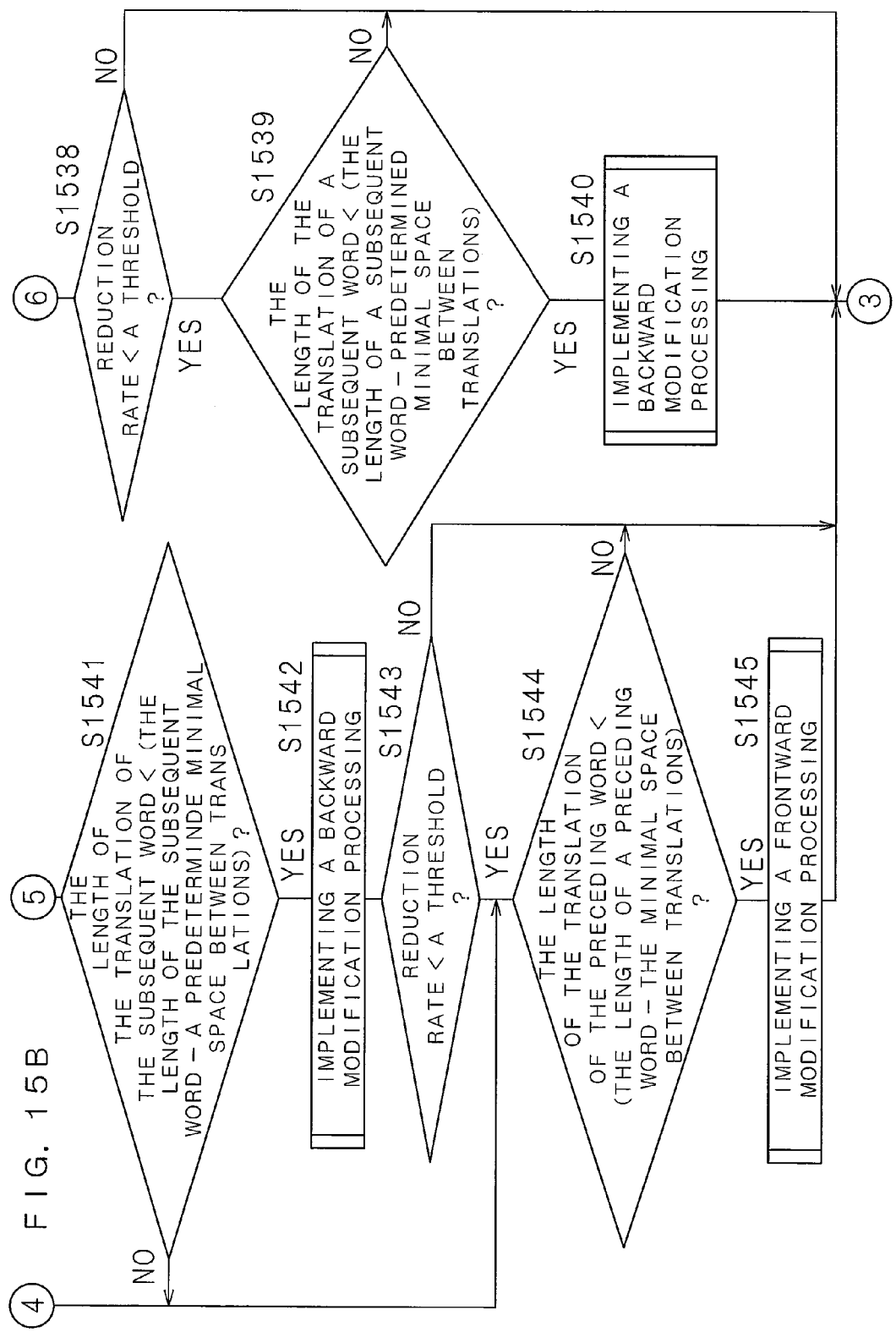

FIG. 16 color identified as green
色　〜が〜であると認識する　　緑

DOCUMENT IMAGE GENERATION APPARATUS, DOCUMENT IMAGE GENERATION METHOD AND RECORDING MEDIUM

CROSS-REFERENCE TO RELATED APPLICATIONS

This Nonprovisional application claims priority under 35 U.S.C. §119(a) on Patent Application No. 2009-255373 filed in Japan on Nov. 6, 2009, the entire contents of which are hereby incorporated by reference.

BACKGROUND

1. Technical Field

The present invention relates to a document image generation apparatus, a document image generation method and a computer program that perform a processing for adding a supplementary annotation on a sentence represented by an image.

2. Description of Related Art

A conventional technique is known to perform a character recognition and an automatic translation on a document represented by electronic data, such as a document represented in an image obtained by scanning of a manuscript. A patent document 1 (Japanese Patent Application Laid-Open No. 7-121539) shows a technique that places a translated word for an original word in a document and in an interline space near the original word, and in the case that the interline space of the document is narrow, the technique changes the character size of the document to be smaller in generation of the document. A patent document 2 (Japanese Patent Application Laid-Open No. 5-324720) shows a technique that adjusts a display form of a translated word in order to make a display length of the translated word shorter than an display length of an original word on a document, when the translated word is placed in the interline space near the original word on the document. A patent document 3 (Japanese Patent Application Laid-Open No. 6-301713) shows a technique that is capable of placing a translated phrase for an original phrase, and of underlining the original phrase. A patent document 4 (Japanese Patent Application Laid-Open No. 2009-53838) shows a technique that generates a translated sentence for an original sentence, and places the translated sentence in an interline space of sentences in generation of a document.

SUMMARY

The technique shown by the patent document 1 changes the character size of a document to be smaller. Thus, it is hard to keep the layout of the document because the image configuration of document is changed. The techniques shown by the patent documents 2 and 3 adjust the display length of translated word, in consideration of keeping the layout in the X axis direction but not in the Y axis direction of a horizontally written document. Thus, it is hard to keep the layout of the document because the document and the translated word are extended in the Y axis direction. The change of document layout causes a problem that it is hard to compare the generated document with the original document. The technique shown by the patent document 4 generates a translated sentence whose word order is different from the word order of an original sentence and thus, it is hard to recognize the relationship of each word between the original sentence and the translated sentence. Furthermore, a misspelled word, a misrecognition of a character and a mistranslation cause an erroneous translation of the whole sentence, and thus, it is hard to utilize the erroneous translation for understanding the meaning of the original document.

The present invention is made in view of such circumstances, and has an object to provide a document image generation apparatus, a document image generation method and a computer program that generate an image of a document in which a supplementary annotation, such as a translated word and phrase is added to an original word and phrase, without changing the character size and the character position, in order to keep the layout of the document and to facilitate understanding the generated document.

The document image generation apparatus according to the present invention is a document image generation apparatus that generates, on the basis of an image representing a document including plural lines, an image representing a supplementary annotation added document in which a supplementary annotation corresponding to a word or a phrase composed of plural words included in the document is added, comprising: an original document image obtaining section that obtains an original document image representing a document; a character recognizing section that recognizes a character included in the original document image obtained by the original document image obtaining section and identifies a position of the character in the original document image; a supplementary annotation obtaining section that determines a meaning of a word or a phrase included in the document constructed of a plurality of the recognized characters by the character recognizing section through a natural language processing performed on the document, and obtains a supplementary annotation corresponding to the meaning of each word or phrase; a position determining section that determines, as a position at which the obtained supplementary annotation corresponding to each word or phrase should be placed in a document, a position in an interline space near a word or a phrase in an original document image on the basis of a position of the character recognized by the character recognizing section; and an image generating section that generates an image representing a supplementary annotation added document by superimposing a supplementary annotation text layer on an original document image layer configured from an original document image, the supplementary annotation text layer including each supplementary annotation placed at a position corresponding to a position determined in the original document image by the position determining section.

The document image generation apparatus according to the present invention is a document image generation apparatus that generates, on the basis of an image representing a document including plural lines, an image representing a supplementary annotation added document in which a supplementary annotation corresponding to a word or a phrase composed of plural words included in the document is added, comprising: a controller that obtains an original document image representing a document, wherein the controller is further capable of recognizing a character included in the obtained document image and identifying a position of the character in the original document image; determining a meaning of a word or a phrase included in the document constructed of a plurality of the recognized characters through a natural language processing performed on the document, and obtaining a supplementary annotation corresponding to the meaning of each word or phrase; determining, as a position at which the obtained supplementary annotation corresponding to each word or phrase should be placed in a document, a position in an interline space near a word or a phrase in an original document image on the basis of a position of the recognized character; and generating an image representing a supplementary annotation added document by superimposing a supplementary annotation text layer on an original document image layer configured from an original document image, the supplementary annotation text layer including each supplementary annotation placed at a position corresponding to the determined position in the original document image.

The document image generation apparatus according to the present invention is a document image generation apparatus, wherein the position determining section comprises: a phrase judging section that judges whether a phrase for which a supplementary annotation is obtained is a discontinuous phrase in which plural words included in the phrase are discontinuously placed in the document; and a annotation arrangement position determining section that determines, as a position at which the supplementary annotation should be placed in a document, a position in an interline space in the original document image near any one of a head word in a discontinuous phrase, a continuous word string included in the discontinuous phrase and the longest word in the discontinuous phrase, in the case that the phrase for which a supplementary annotation is obtained is the discontinuous phrase.

The document image generation apparatus according to the present invention is a document image generation apparatus, wherein the controller is further capable of judging whether a phrase for which a supplementary annotation is obtained is a discontinuous phrase in which plural words included in the phrase are discontinuously placed in the document; and determining, as a position at which a supplementary annotation should be placed in a document, a position in an interline space in the original document image near any one of a head word in a discontinuous phrase, a continuous word string included in the discontinuous phrase and the longest word in the discontinuous phrase, in the case that the phrase for which a supplementary annotation is obtained is the discontinuous phrase.

The document image generation apparatus according to the present invention is a document image generation apparatus, wherein the image generating section further superimposes a marked image layer on the original document image layer, and the marked image layer is configured from an image in which a mark indicating a discontinuous phrase is placed at a position corresponding to the position of a discontinuous phrase in the original document image.

The document image generation apparatus according to the present invention is a document image generation apparatus, wherein the controller is further capable of superimposing a marked image layer on the original document image layer, and the marked image layer is configured from an image in which a mark indicating a discontinuous phrase is placed at a position corresponding to the position of a discontinuous phrase in the original document image.

The document image generation apparatus according to the present invention is a document image generation apparatus, further comprising: a annotation addition object selecting section that selects a word or a phrase at which a supplementary annotation should be placed, from words or phrases included in the document, wherein the position determining section further comprises: a annotation length judging section that judges whether or not a length of a supplementary annotation is longer than a length of the word or phrase corresponding to the supplementary annotation; a object front-back annotation addition judging section that judges whether or not another supplementary annotation should be placed at a word in front of or behind the word or phrase, in the case that the length of the supplementary annotation is longer than the length of the word or phrase corresponding to the supplementary annotation; an annotation expended position determining section that determines, as a the position at which the supplementary annotation should be placed in the document, a position including a position in an interline space near the word or the phrase corresponding to the supplementary annotation and a position in an interline space near the word, either of the words in front of or behind the word or the phrase corresponding to the supplementary annotation, at which another supplementary annotation should not be placed, in the case that another supplementary annotation should not be placed at either one or both of the words in front of and behind the word or the phrase; a front-back annotation length judging section that judges whether or not a length of said another supplementary annotation is shorter than a length which is obtained by subtraction of a predetermined length from a length of a word, either of the words in front of and behind the word or the phrase corresponding to the supplementary annotation, at which said another supplementary annotation should be placed, in the case that said another supplementary annotation should be placed at either one or both of the words in front of and behind the word or the phrase corresponding to the supplementary annotation; a annotation partially expended position determining section that determines, as a position at which the supplementary annotation should be placed in the document, a position including a position in an interline space near the word or the phrase corresponding to the supplementary annotation and a part of a position in the interline space near a word, either of the words in front of and behind the word and the phrase, at which another supplementary annotation should be placed and whose length minus a predetermined length is longer than the length of said another supplementary annotation, in the case that the length of said another supplementary annotation is shorter than a length which is obtained by subtraction of the predetermined length from the length of the word at which said another supplementary annotation should be placed; and a annotation reduction rate calculating section that calculates a reduction rate for reducing a length of a supplementary annotation which is longer than a length of a character string that can be placed at a position determined to be a position for placing the supplementary annotation in the documents.

The document image generation apparatus according to the present invention is a document image generation apparatus, wherein the controller is further capable of: selecting a word or a phrase at which a supplementary annotation should be placed, from words or phrases included in the document; judging whether or not a length of a supplementary annotation is longer than a length of the word or phrase corresponding to the supplementary annotation; judging whether or not another supplementary annotation should be placed at a word in front of or behind the word or phrase, in the case that the length of the supplementary annotation is longer than the length of the word or phrase corresponding to the supplementary annotation; determining as a position at which the supplementary annotation should be placed in the document, a position including a position in an interline space near the word or the phrase corresponding to the supplementary annotation and a position in an interline space near the either one of the words in front of and behind the word or the phrase corresponding to the supplementary annotation at which another supplementary annotation should not be placed, in the case that another supplementary annotation should not be placed at either one or both of the words in front of and behind the word or the phrase; judging whether or not a length of said another supplementary annotation is shorter than a length which is obtained by subtraction of a predetermined length from a length of a word, either of the words in front of and behind the word or the phrase corresponding to the supplementary annotation, at which said another supplementary annotation should be placed, in the case that said another supplementary annotation should be placed at either one or both of the words in front of and behind the word or the phrase corresponding to the supplementary annotation; determining, as a position at which the supplementary annotation should be placed in the document, a position including a position in an interline space near the word or the phrase corresponding to the supplementary annotation and a part of a position in an interline space near a word, either of the words in front of and behind the word and the phrase, at which another supplementary annotation should be placed and whose length minus the predetermined length is longer than the length of said another supplementary annotation, in the case that the length of said another supplementary annotation is shorter than a length which is obtained by subtraction of a predetermined length from the length of the word at which another supplementary annotation should be placed; and calculating a reduction rate for reducing a length of a supplementary annotation which is longer than a length of a character string that can be placed at a position determined to be a position for placing the supplementary annotation in the documents.

The document image generation apparatus according to the present invention is a document image generation apparatus, wherein the image generating section superimposes an original document text layer on the original document image layer, and in the original document text layer, text data indicating each character in the original document image is placed in a transparent state at a position corresponding to each character in the original document image.

The document image generation apparatus according to the present invention is a document image generation apparatus, wherein the controller is further capable of superimposing an original document text layer on the original document image layer, and in the original document text layer, text data indicating each character in the original document image is placed in a transparent state at a position corresponding to each character in the original document image.

The document image generation apparatus according to the present invention is a document image generation apparatus, wherein the supplementary annotation obtaining section obtains a translation for a word or a phrase, a reading for the word or the phrase or an annotation for the word or the phrase as the supplementary annotation.

The document image generation apparatus according to the present invention is a document image generation apparatus, wherein the controller is further capable of obtaining a translation for a word or a phrase, a reading for the word or the phrase or an annotation for the word or the phrase as the supplementary annotation.

The document image generation apparatus according to the present invention is a document image generation apparatus, wherein the supplementary annotation obtaining section performs a natural language processing on contents of a document configured from character strings of each line connected with one another in order of lines, the character strings are configured from characters recognized by the character recognizing section.

The document image generation apparatus according to the present invention is a document image generation apparatus, wherein the controller is further capable of performing a natural language processing on contents of a document configured from character strings of each line connected with one another in order of lines, and the character strings are configured from the recognized characters.

The document image generation apparatus according to the present invention is a document image generation apparatus that generates, on the basis of an image representing a document including plural lines, an image representing a supplementary annotation added document in which a translation is added as a supplementary annotation corresponds to a word or a phrase composed of plural words included in the document, comprising: an original document image obtaining section that obtains an original document image representing a document; a character recognizing section that recognize a character included in the original document image obtained by the original document image obtaining section and identifies a position of the character in the original document image; a translation obtaining section that obtains a translation corresponding to a meaning of each word or phrase, in which the meaning is determined through a natural language processing performed on contents of a document configured from character strings of each line connected with one another in order of lines and the character strings are configured from characters recognized by the character recognizing section; an translation addition object selecting section that selects a word or a phrase to which a translation should be added, from words or phrases included in the document; a position determining section that determines a position in which the obtained translation corresponding to each word or phrase should be placed in an interline space near a word or a phrase in an original document image on the basis of a position of a character recognized by the character recognizing section; a document image generating section that generates an image representing a supplementary annotation added document by superimposing a supplementary annotation text layer, a marked image layer and an original document text layer on an original document image layer configured from an original document image, the supplementary annotation text layer including each translation placed at a position corresponding to a position determined in the original document image by the position determining section, the marked image layer being configured from an image where a mark indicating a discontinuous phrase is placed at a position corresponding to the position of a discontinuous phrase in the original document image, and the original document text layer being configured from text data that indicates each character included in the original document image and is placed in a transparent state at a position corresponding to each character in the original document image, wherein the position determining section comprises: an translation arrangement position determining section that determines, as a position at which the translation should be placed in a document, a position in an interline space in the original document image near the longest one of a head word in a discontinuous phrase, a continuous word string in the discontinuous phrase and a longest word in the discontinuous phrase, for the discontinuous phrase, among the phrases for which the translations are obtained, in which plural words in the phrase are discontinuously placed in the document; a object front-back translation addition judging section that judges whether or not another translation should be placed at a word in front of or behind the word or the phrase, whose translation, among the translations, is longer than the length of the corresponding word or phrase; an translation expanded position determining section that determines, as a position at which a translation should be placed in the document, a position including a position in an interline space near the word or the phrase corresponding to the translation and a position in the interline space near the word, either of the words in front of or behind the word or the phrase corresponding to the translation, at which another translation should not be placed, in the case that another translation should not be placed at either one or both of the words in front of and behind the word or the phrase corresponding to the translation; a front-back translation length judging section that judges whether or not a length of said another translation is shorter than a length which is obtained by subtraction of a predetermined length from a length of a word, either of the words in front of and behind the word or the phrase corresponding to the translation, at which said another translation should be placed, in the case that another translation should be placed at either one or both of the words in front of and behind the word or phrase corresponding to the translation; a translation partially expanded position determining section that determines, as a position at which a translation should be placed in the document, a position including a position in an interline space near a word or a phrase corresponding to the translation and a part of a position in an interline space near a word, either of the words in front of and behind the word or the phrase, at which another translation should be placed and whose length minus a predetermined length is longer than the length of said another translation, in the case that the length of said another translation is shorter than a length which is obtained by subtraction of a predetermined length from the length of the word at which said another translation should be placed; and a translation reduction rate calculating section that calculates a reduction rate for reducing a length of a translation which is longer than a length of a character string that can be placed at a position determined to be a position for placing the translation in the documents.

The document image generation apparatus according to the present invention is a document image generation apparatus that generates, on the basis of an image representing a document including plural lines, an image representing a supplementary annotation added document in which a translation is added as a supplementary annotation corresponds to a word or a phrase composed of plural words included in the document, comprising: a controller that obtains an original document image representing a document, wherein the controller is further capable of: recognizing a character included in the obtained document image and identifying a position of the character in the original document image; obtaining a translation corresponding to a meaning of each word or phrase, in which the meaning is determined through a natural language processing performed on contents of a document configured from character strings of each line connected with one another in order of lines and the character strings are configured from the recognized characters; selecting a word or a phrase to which a translation should be added, from words or phrases included in the document; determining a position in which the obtained translation corresponding to each word or phrase should be placed in an interline space near a word or a phrase in an original document image on the basis of a position of a recognized character; generating an image representing a supplementary annotation added document by superimposing a supplementary annotation text layer, a marked image layer and an original document text layer on an original document image layer configured from an original document image, the supplementary annotation text layer including each translation placed at a position corresponding to a determined position in the original document image, the marked image layer being configured from an image where a mark indicating a discontinuous phrase is placed at a position corresponding to the position of a discontinuous phrase in the original document image, and the original document text layer being configured from text data that indicates each character included in the original document image and is placed in a transparent state at a position corresponding to each character in the original document image; determining, as a position at which the translation should be placed in a document, a position in an interline space in the original document image near the longest one of a head word in a discontinuous phrase, a continuous word string in the discontinuous phrase and a longest word in the discontinuous phrase, for the discontinuous phrase, among the phrases for which the translations are obtained, in which plural words in the phrase are discontinuously placed in the document; judging whether or not another translation should be placed at a word in front of or behind the word or the phrase, whose translation, among the translations, is longer than the length of the corresponding word or phrase; determining, as a position at which a translation should be placed in the document, a position including a position in an interline space near the word or the phrase corresponding to the translation and a position in the interline space near the word, either of words in front of or behind the word or the phrase corresponding to the translation, at which another translation should not be placed, in the case that another translation should not be placed at either one or both of the words in front of and behind the word or the phrase corresponding to the translation; judging whether or not a length of said another translation is shorter than a length which is obtained by subtraction of a predetermined length from a length of a word, either of the words in front of and behind the word or the phrase corresponding to the translation, at which said another translation should be placed, in the case that another translation should be placed at either one or both of the words in front of and behind the word or the phrase corresponding to the translation; determining, as a position at which a translation should be placed in the document, a position including a position in an interline space near a word or a phrase corresponding to the translation and a part of a position in an interline space near a word, either of the words in front of and behind the word or the phrase, at which another translation should be placed and whose length minus a predetermined length is longer than the length of said another translation, in the case that the length of said another translation is shorter than a length which is obtained by subtraction of a predetermined length from the length of the word at which said another translation should be placed; and calculating a reduction rate for reducing a length of a translation which is longer than a length of a character string that can be placed at a position determined to be a position for placing the translation in the documents.

The document image generation apparatus according to the present invention is a document image generation apparatus, further comprising: a receiving section that receives data for a web page sent from an external apparatus; and a displaying section that displays a web page based on the data received by the receiving section, wherein the original document image obtaining section comprises a web-page obtaining section that obtains a web page as an original document image.

The document image generation apparatus according to the present invention is a document image generation apparatus, further comprising: a receiving section that receives data for a web page sent from an external apparatus; and a displaying section that displays a web page based on the data received by the receiving section, wherein the controller is further capable of obtaining a web page as an original document image.

The document image generation method according to the present invention is a document image generation method for generating an image representing a supplementary annotation added document on the basis of an image representing a document including plural lines, in which a supplementary annotation corresponding to a word or a phrase composed of plural words included in the document is added, comprising:

a step of obtaining an original document image representing a document; a step of recognizing a character included in the obtained document image and identifying a position of the character in the original document image; a step of determining a meaning of word or a phrase included in the document through a natural language processing performed on the document composed of a plurality of the recognized characters, and obtaining a supplementary annotation corresponding to the meaning of each word or phrase; a step of determining, as a position at which the obtained supplementary annotation corresponding to each word or phrase should be placed in a document, a position in an interline space near a word or phrase in an original document image on the basis of a position of the recognized character; and a step of generating an image representing a supplementary annotation added document by superimposing a supplementary annotation text layer on an original document image layer configured from an original document image, the supplementary annotation text layer including each supplementary annotation placed at a position corresponding to the position determined in the original document image at the step of determining a position.

The computer readable recording medium according to the present invention is a computer readable recording medium having a computer program recorded for causing a computer to perform a processing for generating, on the basis of an image representing a document including plural lines, an image representing a supplementary annotation added document in which a supplementary annotation corresponding to a word or a phrase composed of plural words included in the document is added, wherein the computer program comprising: a step of obtaining an original document image representing a document; a step of recognizing a character included in the obtained document image and identifying a position of the character in the original document image; a step of determining a meaning of a word or phrase included in the document through a natural language processing performed on the document composed of a plurality of the recognized characters, and obtaining a supplementary annotation corresponding to the meaning of each word or phrase; a step of determining a position in an interline space near a word or phrase in an original document image on the basis of a position of the recognized character, as a position at which the obtained supplementary annotation corresponding to each word or phrase should be placed in a document; and a step of generating an image representing a supplementary annotation added document by superimposing a supplementary annotation text layer on an original document image layer configured from an original document image, the supplementary annotation text layer including each supplementary annotation placed at a position corresponding to the position in the original document image determined at the step of determining a position.

According to an aspect of the present invention, characters are recognized from an original document image obtained by an image reading apparatus and the like, a natural language processing is performed on the document that is configured from the recognized characters, and a supplementary annotation is obtained which includes a translated word, phrase on the like for an original word or phrase included in the document. Then, a supplementary annotation text layer is generated in which the obtained supplementary annotation is placed in an interline space near the original word or phrase, and the generated supplementary annotation text layer is overlaid onto an original document image layer generated from the original image. Thus, it is possible to generate a document image in which the supplementary annotation is added (hereinafter, supplementary annotation added document image).

According to an aspect of the present invention, in the case that an original phrase for which a supplementary annotation is obtained is a discontinuous phrase, in a supplementary annotation image, the obtained supplementary annotation is placed at a position corresponding to a position in an interline space near continuous words, a continuous word string or a longest word included in the discontinuous phrase. Therefore, the supplementary annotation is placed at a proper position which facilitates understanding of the meaning of the discontinuous phrase.

According to an aspect of the present invention, a marked image layer is generated in which a mark is added, such as a straight underline for highlighting a discontinuous phrase. The generated marked image layer is superimposed on an original document image layer to generate a supplementary annotation added document image. Therefore, the range of a discontinuous phrase can be precisely indicated in the supplementary annotation added document image.

According to an aspect of the present invention, in the case that a generated supplementary annotation is longer than an original word or phrase, the length of the supplementary annotation is reduced in order to properly place the supplementary annotation in a disposition space for placing the supplementary annotation. In the case that there is no adjacent word at which another supplementary annotation should be placed, it is possible to dispose the supplementary annotation not only at a position in the interline space near the original word or phrase but also at a position in the interline spaces near the adjacent word or phrase. Even in the case that an adjacent word requires another supplementary annotation but the length of said another supplementary annotation which is to be disposed near the adjacent word is smaller than the length of the adjacent word, it is possible to dispose the supplementary annotation not only at a position in the interline space near the original word or phrase but also at a position including a part of the position in the interline space near the word in front of and behind the original word or the phrase.

According to an aspect of the present invention, in addition to a supplementary annotation text layer, an original document text layer, in which respective text data that indicate characters included in an original document image are placed at positions corresponding to respective positions of characters, is superimposed on the original image layer so as to generate a supplementary annotation added document image. Thus, it is possible to search the original document on the basis of a text included in the original document text layer or a text included in the supplementary annotation text layer.

According to an aspect of the present invention, the supplementary annotation is a translated word for an original word or phrase, a Japanese kana-reading or an annotation for the original word or phrase.

According to an aspect of the present invention, the natural language processing is performed on the content of a document in which each line is configured from the recognized characters and is connected to another line, in the order of lines. Thus, it is possible to perform the natural language processing for a sentence appearing on plural lines.

According to an aspect of the present invention, it is possible to generate the original image from web page data, to generate a supplementary annotation added document image from the generated original document image, and thus to facilitate understanding of the web page.

According to an aspect of the present invention, a supplementary annotation added document image is generated through superimposing a supplementary annotation text layer on an original document image layer. Thus, it is possible to prevent the character size and position of a character in the document from being changed, and to keep the layout of the document. In addition, in the supplementary annotation added document image is configured with a translated sentence for the whole of an original sentence in a document but with translated words or phrases added to original words or phrases. Thus, it is possible to effectively utilize the space in the document, to clearly show the relationship between the original word and the translated word, and to facilitate understanding of the relationship, better than a method in which a translated whole sentence is simply placed. Therefore, it is possible to easily compare the original document and the document added with the translated words or phrases, and to easily understand the original document.

According to an aspect of the present invention, an original document image layer is generated through treating an obtained document image itself as an original document image, instead of re-forming for image processing an original document image based on the obtained original document image. Thus, it is possible to prevent the contents of the original document from being changed, for example, by a misrecognition occurring in the character recognition. In addition, a supplementary annotation text layer in a supplementary annotation added document image is not mainly configured with image data but with text data. Therefore, it is possible to reduce the data size of the supplementary annotation added document image. Further, the text in the supplementary annotation text layer can be utilized for searching the contents of original document. Therefore, it is possible to facilitate considering of the contents of the original document in detail, or re-utilizing the contents of original document. Furthermore, the supplementary annotation added document image is generated with the superimposed layers, not only the original document image layer, but also the supplementary annotation text layer, the marked image layer and the original document text layer, each of which is generated independently from the other layers. Therefore, it facilitates performance of the processing and selection of a layer, better than a method that requires formation of an image which includes all of such layers.

The above and further objects and features will be apparent more fully from the following detailed description with accompanying drawings.

BRIEF DESCRIPTION OF THE SEVERAL VIEWS OF THE DRAWINGS

FIG. 4 is a conceptual view showing an example of character data obtained by character recognition.

FIG. 5 is a flowchart showing a procedure of translation obtainment processing, at step S14.

FIG. 6 is a conceptual view showing examples of line data.

FIG. 7 is a conceptual view showing examples of text data and line feed data.

FIG. 8 is a conceptual view showing examples of translation data.

FIG. 13 is a schematic view showing an example in the case that a length of a translated word is longer than a length of an original word.

FIG. 14 is a schematic view showing examples in the case that a length of a translated phrase is longer than a length of an original phrase and other translated words are placed in front of and behind the translated phrase.

FIG. 15A and FIG. 15B are flowchart showing a procedure after a step S1512 of additional information determination processing that can shift both a start position and an end position of a translated word.

FIG. 16 is a schematic view showing an example in the case that the length of a translated phrase is longer than the length of an original phrase and other translated words are placed in front of and behind the translated phrase.

DETAILED DESCRIPTION

Hereinafter, the present invention is described in detail with reference to figures illustrating embodiments according to the present invention.

Embodiment 1

Figure 1:
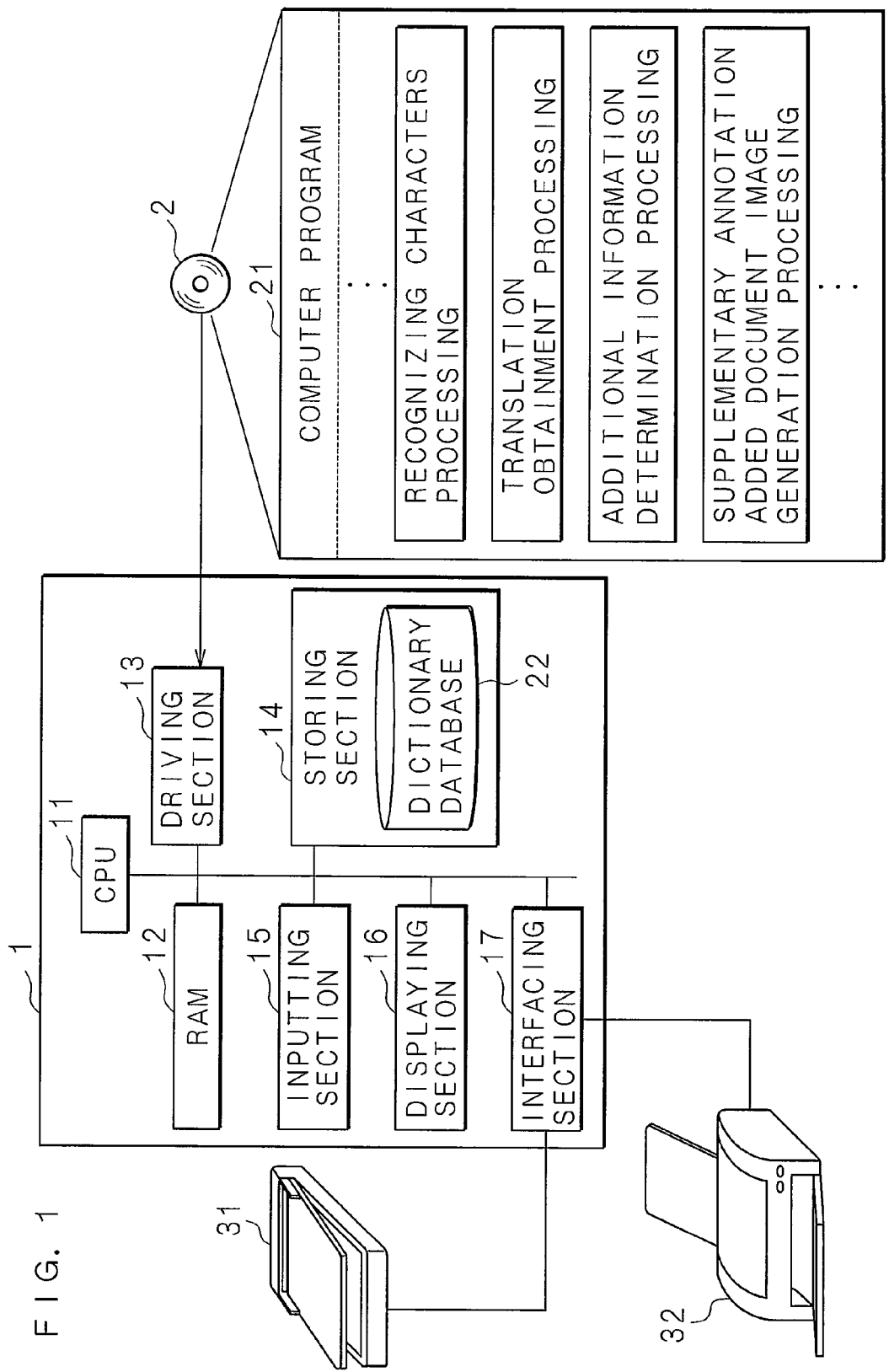
FIG. 1 is a block diagram showing the internal configuration of a document image generation apparatus according to an embodiment 1 of the present invention.

FIG. 1 is a block diagram showing the internal configuration of a document image generation apparatus according to an embodiment 1 of the present invention. The document image generation apparatus 1 according to the embodiment 1 is configured from a general-purpose computer, such as a PC or a server apparatus, and includes: a CPU 11 that performs calculations; a RAM 12 that stores temporal information generated through the calculations; a driving section 13, such as a CD-ROM drive, that reads information from a recording medium 2, such as an optical disc or a memory card; and a storing section 14, such as a hard disk. The CPU 11 makes the driving section 13 read a computer program 21 according to the present invention from the recording medium 2, and stores the read computer program 21 in the storing section 14. As needed, the computer program 21 is loaded from the storing section 14 onto the RAM 12. The CPU 11 performs required processing based on the loaded computer program 21, for the document image generation apparatus. Alternatively, the computer program 21 may be downloaded into the storing section 14 from an external server apparatus (not shown) through a communication network, such as the Internet or a LAN.

The storing section 14 stores a dictionary database 22 that records data required for a natural language processing. The data recorded by the dictionary database 22 indicate information, such as a grammar of a language, a frequency of appearance of a sentence structure and a meaning of a word. The dictionary database 22 may be previously stored in the storing section 14. Alternatively, the dictionary database 22 may be stored in the recording medium 2, read from the recording medium 2 by the driving section 13 and then stored in the storing section 14.

The document image generation apparatus 1 further includes: an inputting section 15, such as a keyboard or a pointing device, with which instructions for various processing are inputted in response to the user's handling; and a displaying section 16, such as a liquid crystal display, for displaying various information. Furthermore, the document image generation apparatus 1 includes an interfacing section 17 that is connected to an image reading apparatus 31 and an image forming apparatus 32. The image reading apparatus 31 is a scanner, such as a flatbed scanner or a film scanner. The image forming apparatus 32 is a printer, such as an inkjet printer or a laser printer. Alternatively, the image reading apparatus 31 and the image forming apparatus 32 may be configured as one apparatus. The image reading apparatus 31 optically reads an image recorded on a document manuscript to generate image data, and then sends the generated image data to the document image generation apparatus 1. The interfacing section 17 receives the image data sent from the image reading apparatus 31. Then, the interfacing section 17 sends the received image data to the image forming apparatus 32. The image forming apparatus 32 forms an image based on the image data sent from the document image generation apparatus 1.

The CPU 11 loads the computer program 21 according to the present invention into the RAM 12, and performs processing with a document image generation method according to the present invention, on the basis of the loaded computer program 21. The document image generation method makes the image reading apparatus 31 read the image of the document manuscript to generate an original document image, and generates a supplementary annotation added document image in which a translated word or phrase for an original word or phrase in the document manuscript is added as a supplementary annotation. A "phrase" here means a term consisting of plural words, and having a particular meaning. The "phrase" corresponds to a noun phrase, a verb phrase, an idiom or an idiomatic phrase. Phrases are categorized into a "continuous phrase" and a "discontinuous phrase". A "continuous phrase" is a phrase composed of plural words that are continuously stringed in a sentence. A "discontinuous phrase" is a phrase that is composed of plural words discontinuously arranged in a sentence. Assume a sentence "He takes difference into consideration". In this sentence, the part "takes . . . into consideration" is a discontinuous phrase, in which an irrelevant word is arranged among the plural words of discontinuous phrase. In this embodiment, a phrase having a line feed at the halfway is also treated as a discontinuous phrase.

Figure 2A:
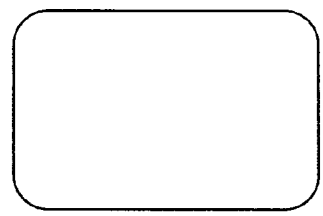
FIG. 2 is a schematic view showing examples of an original document image and a supplementary annotation added document image.
Figure 2B:
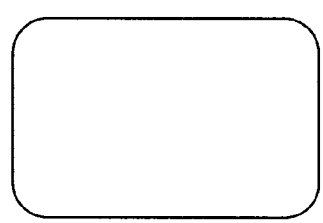

FIG. 2 is a schematic view showing examples of an original document image and a supplementary annotation added document image. FIG. 2A shows an example of an original document image and FIG. 2B shows an example of a supplementary annotation added document image. The original document image shown in FIG. 2A includes a sentence, "X-ray crystallographic analysis also confirmed the molecular structure." The document image generation method according to the present invention generates a supplementary annotation added document image which is provided with a translated phrase (japanese) for the original phrase "X-ray crystallographic analysis" and translated words for the original words "confirmed", "molecular" and "structure", as shown in FIG. 2B. Basically, the phrase "X-ray crystallographic analysis" is categorized into a continuous phrase. However, this phrase includes a line feed at the halfway in the example of FIG. 2A. Thus, this phrase is treated as a discontinuous phrase. The present embodiment is described in the context of a horizontally written document in which the translated words are placed at the interline space under the original word and phrase, as shown in FIG. 2.

Figure 3:
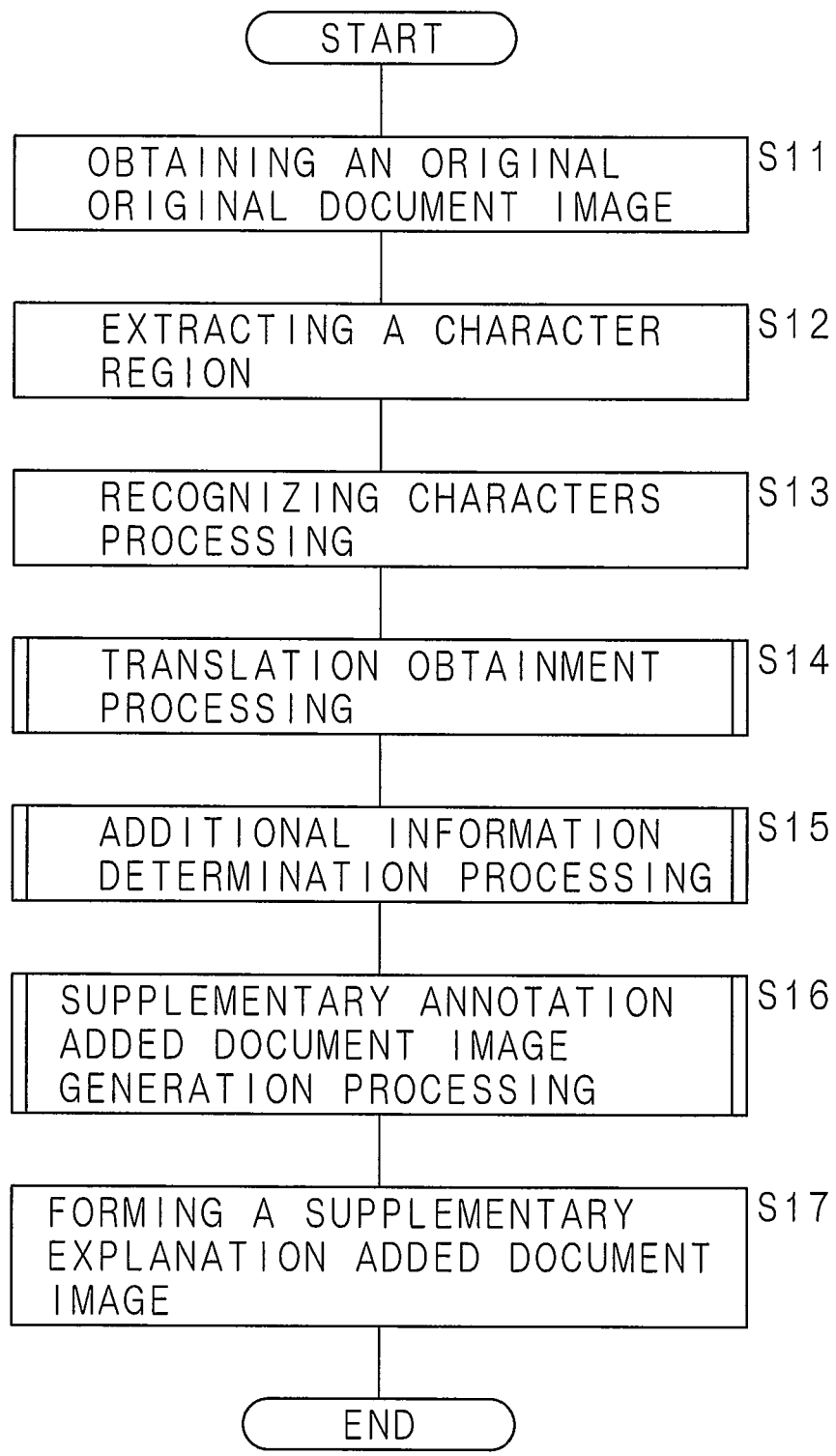
FIG. 3 is a flowchart showing a procedure performed by the document image generation apparatus according to the embodiment 1.

FIG. 3 is a flowchart showing a procedure performed by the document image generation apparatus 1 according to the embodiment 1. The CPU 11 performs the processing described below, on the basis of the computer program 21 loaded in the RAM 12.

It should be noted that the CPU 11 serves as claimed elements, such as an original document image obtaining section, a character recognizing section, a supplementary annotation obtaining section, a position determining section, an image generating section, a phrase judging section, a annotation arrangement position determining section, a annotation addition object selecting section, a annotation length judging section, a object front-back annotation addition judging section, an annotation expended position determining section, a front-back annotation length judging section, a annotation partially expended position determining section, a annotation reduction rate calculating section, a translated word obtaining section, an translation addition object selecting section, a document image generating section, an translation arrangement position determining section, a object front-back translation addition judging section, an translation expanded position determining section, a front-back translation length judging section, a translation partially expanded position determining section, a translation reduction rate calculating section, and a web-page obtaining section.

The document image generation apparatus 1 firstly obtains an original document image, which is an image representing a document (S11). At step S11, a user puts a document manuscript on the image reading apparatus 31 and handles the inputting section 15. The inputting section 15 accepts a processing instruction and then the CPU 11 sends an image reading instruction from the interfacing section 17 to the image reading apparatus 31. The image reading apparatus 31 optically reads an image recorded on the document manuscript to generate image data, and sends the generated image data to the document image generation apparatus 1. The document image generation apparatus 1 utilizes the interfacing section 17 to receive the image data sent from the image reading apparatus 31, and stores the received image data in the RAM 12 to obtain an original document image which is represented by the received image data. Alternatively, read image data that is previously stored in the storing section 14 may be read out to the RAM 12, for obtaining the original document image at step S11. As needed, the CPU 11 may perform some image processing at step S11, such as an adjustment of the resolution and conversion of the image data format.

Next, the CPU 11 extracts a character region, which is a region including characters, from the original document image represented by the image data stored in the RAM 12 (S12). Then, the CPU 11 performs processing for recognizing characters processing included in on the extracted character region (S13). The CPU 11 utilizes, for example, a conventional optical character recognition (OCR) technique at step S13 to recognize characters included in the character region and to identify the character positions of recognized characters in the original document image.

FIG. 4 is a conceptual view showing an example of character data obtained by the character recognition. The example shown in FIG. 4 is a part of the result that is obtained by the character recognition which recognizes characters in the original document image shown in FIG. 2. The character data obtained by the character recognition includes the result of character recognition and additional information relating to the characters. The character recognition is configured to recognize a character space in a line as a character to be recognized. Thus, the character data includes the recognition result in which a character space is recognized as a character to be recognized, and includes the additional information related to recognition result. The character data shown in FIG. 4 include: a character number sequentially assigned to each recognized character; a position of each recognized character in the original document image; and a region number assigned to a character region; an in-line position information representing a position of each recognized character in the line; a character size; and a recognition result indicating the recognized character. The position of each character is represented by four coordinates: an X coordinate for the left edge of a character; a Y coordinate for the top edge of a character; an X coordinate for the right edge of a character; and a Y coordinate for the bottom edge of a character. The example shown in FIG. 4 sets the left-bottom of an original document image as the origin for each coordinate and expresses the coordinates in points. The in-line position information indicates the position of a character in the line with any one of the numbers "0", "1", "2" and "3". The number "1" represents the head of a line. The number of "0" represents the end of a line. The number "0" represents the middle of a line. The number "3" represents both the head of a line and the end of a line. For example, in the case that there is no character on the left of a recognized character in the original document image, the CPU 11 generates the number "1" as the in-line position information. In the case that there is no character on the right of a recognized character in the original document image, the CPU 11 generates the number "2" as the in-line position information. For example, in the case that there is no character on the left and right of a recognized character in the original document image, the CPU 11 generates the number "3" as the in-line position information. A character size is represented by a font size which is given in points. The CPU 11 makes the RAM 12 store the character data obtained by the character recognition at step S13.

Next, the CPU 11 performs a translation (for example, japanese translation) obtainment processing, on the basis of the character data obtained by the character recognition, to obtain a translated word or phrase for an original word or phrase included in the document that is configured from the recognized characters (S14). FIG. 5 is a flowchart showing a procedure of translation obtainment processing, at step S14. The CPU 11 generates line data that is based on the character data obtained at step S13 (S141). The line data represents contents of text in each line included in the original document. At step S141, the CPU 11 places characters from the head of a line to the end of the line in the order of character numbers, to generate the line data for one line. Similarly, the CPU 11 generates such line data for each of the other lines. FIG. 6 is a conceptual view showing examples of the line data. The examples shown in FIG. 6 are generated from the example of original image data shown in FIG. 2, in which line numbers are associated with line texts of corresponding lines, respectively. The line numbers start with "0" and are sequentially assigned to respective lines. The line texts represent contents of texts in respective lines and are configured from character codes, each of which represents a character recognized by the character recognition.

Next, the CPU 11 generates text data and line feed data on the basis of the generated line data (S142). The text data indicate texts included in the original document, and the line feed data represent line feed positions in the original document. At step S142, the CPU 11 connects the line text for each line with another line text for another line in the order of the line numbers, for generating text data. In the case that the original document is written in a language, like English, in which words are separated by spaces, each line text is provided with a character space at its end and then connected to another line text. The reason is that the words are generally separated at the line feed position in a language in which words are separated by spaces. In the case of a language, like Japanese, in which words are not separated by spaces, the CPU 11 connects the line text with another line text without providing a character space. At step S142, the CPU 11 further stores information representing a position in the text data generated by connection which corresponds to the line feed position in the original document, for generating the line feed data, every time the CPU 11 connects line texts.

FIG. 7 is a conceptual view showing examples of the contents of text data and the line feed data. FIG. 7A is an example of text data in which respective line data shown in FIG. 6 are properly connected. In FIG. 7, the text data is displayed on two lines, but it is one line of data in terms of data. The processing at step S142 generates the text data that includes characters recognized at step S13 on the basis of the character region which is extracted at step S12. In other words, the text data generated at step S142 generally includes plural sentences. FIG. 7B is an example of the content of line feed data that represents a line feed positions in a lines corresponding to the respective line numbers which begin with "0" and are sequentially assigned to the respective characters in the text. In the case of a language in which words are separated by spaces, the line feed position may be the position of a space that is provided when the line text is connected to another line text. In the case of a language whose words are not separated by spaces, the line feed position may be the position of a character at the end of each line. Since the line data are connected at their line feed positions to generate the text data, it is possible in the following steps to perform the natural language processing on each sentence, even when the sentence written in plural lines. Therefore, it is possible to perform more efficient and accurate natural language processing. As for a phrase written in plural lines, for example, the natural language processing that performs line-by line processing generates a translation word for each word in a phrase written in plural lines. On the contrary, the natural language processing that performs the processing for plural lines can generate a translated phrase for each phrase written in plural lines.

Next, the CPU 11 performs the natural language processing on the generated text data to presume the meaning of a word and a phrase included in a sentence represented by the text data (S143). At step S143, the CPU 11 performs the natural language processing such as a morphological analysis, a local syntactic analysis, a part of speech presumption and the like, based on the data recorded in the dictionary database 22 to identify a word and a phrase composed of plural words included in a sentence and to presume the meaning of the identified word and phrase. Next, the CPU 11 selects a word and a phrase from words and phrases included in the sentence for which a translated word and phrase should be obtained to be added to a supplementary annotation added document image (S144). Degrees of difficulty are previously set for the words and phrases recorded in the dictionary database 22, respectively. The storing section 14 stores setting information about the degrees of difficulty for words and phrases whose translations should be added in the supplementary annotation added document image. A user can handle the inputting section 15 to previously set the contents of setting information. At step S144, the CPU 11 selects a word and a phrase whose degrees of difficulty are higher than the degrees of difficulty set in the setting information as a word and a phrase whose translation should be obtained. Through the step S144, the selection processing is performed to pick up the word and phrase whose translation should be placed. For the step S144, the displaying section 16 may display an input screen that is utilized for inputting the degree of difficulty of word and phrase whose translation should be added, and the inputting section 15 may accept an input of a degree of difficulty. Alternatively, a user may operate the inputting section 15 to specify the word and phrase, one by one, whose translation should be obtained.

Then, the CPU 11 obtains the translations from the dictionary database 22 for each of the selected word or phrase (S145). In the case that there are plural translations for the selected word or phrase, the CPU 11 selects and obtains one translations corresponding to the meaning presumed by the natural language processing at step S143. The CPU 11 generates translation data in which the selected word or collocation is associated with the translation, stores the generated translation data in the RAM 12, and then returns the procedure to the main processing. FIG. 8 is a conceptual view showing examples of translation data. In these examples, the "X-ray crystallographic analysis" is selected as a phrase whose translated phrase should be obtained, and the words "confirmed", "molecular" and "structure" are selected as words whose translated words should be obtained. The selected phrase and words are associated with the translations, respectively.

Figure 9:
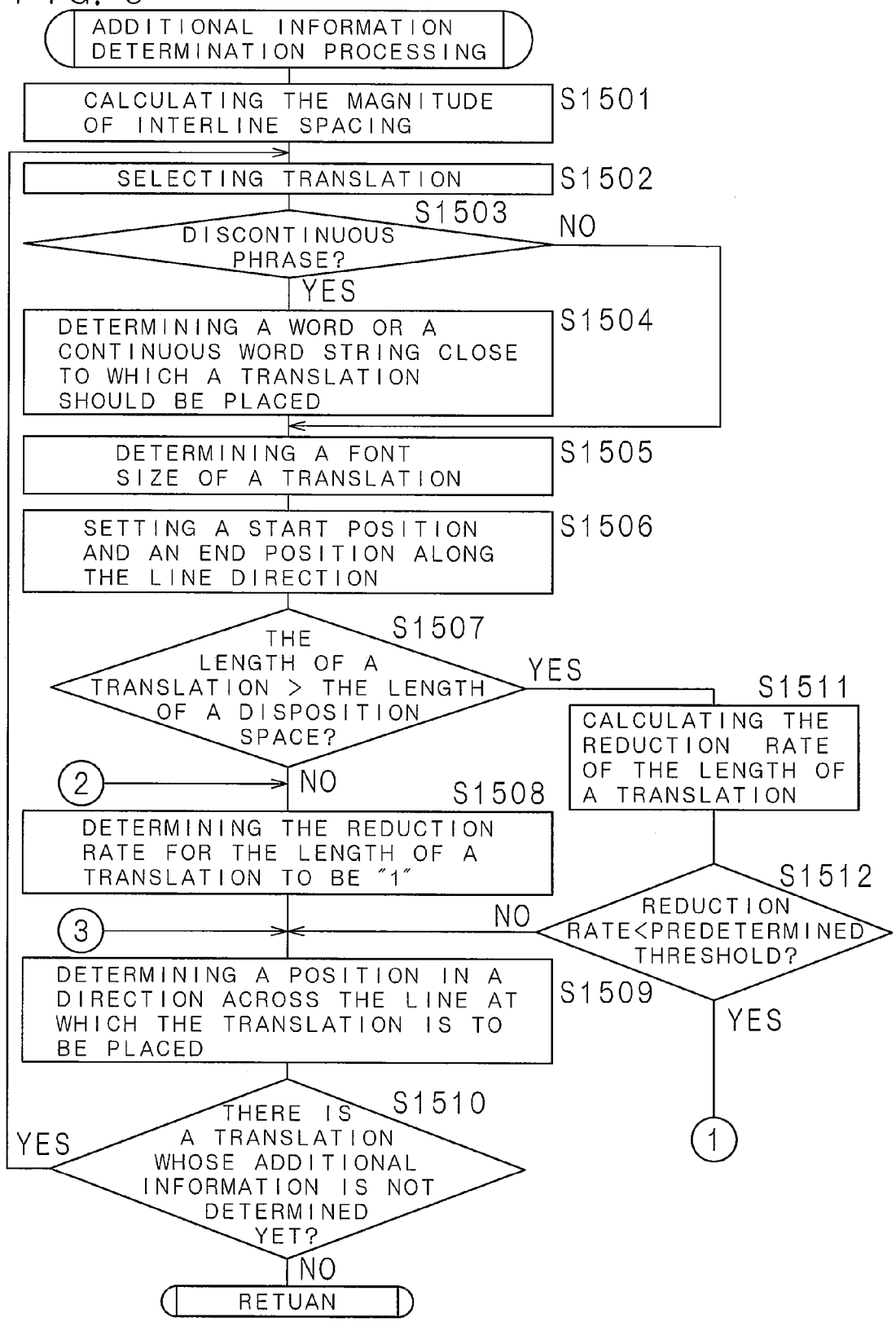
FIG. 9 is a flowchart showing a procedure of additional information determination processing at step S15.
Figure 10:
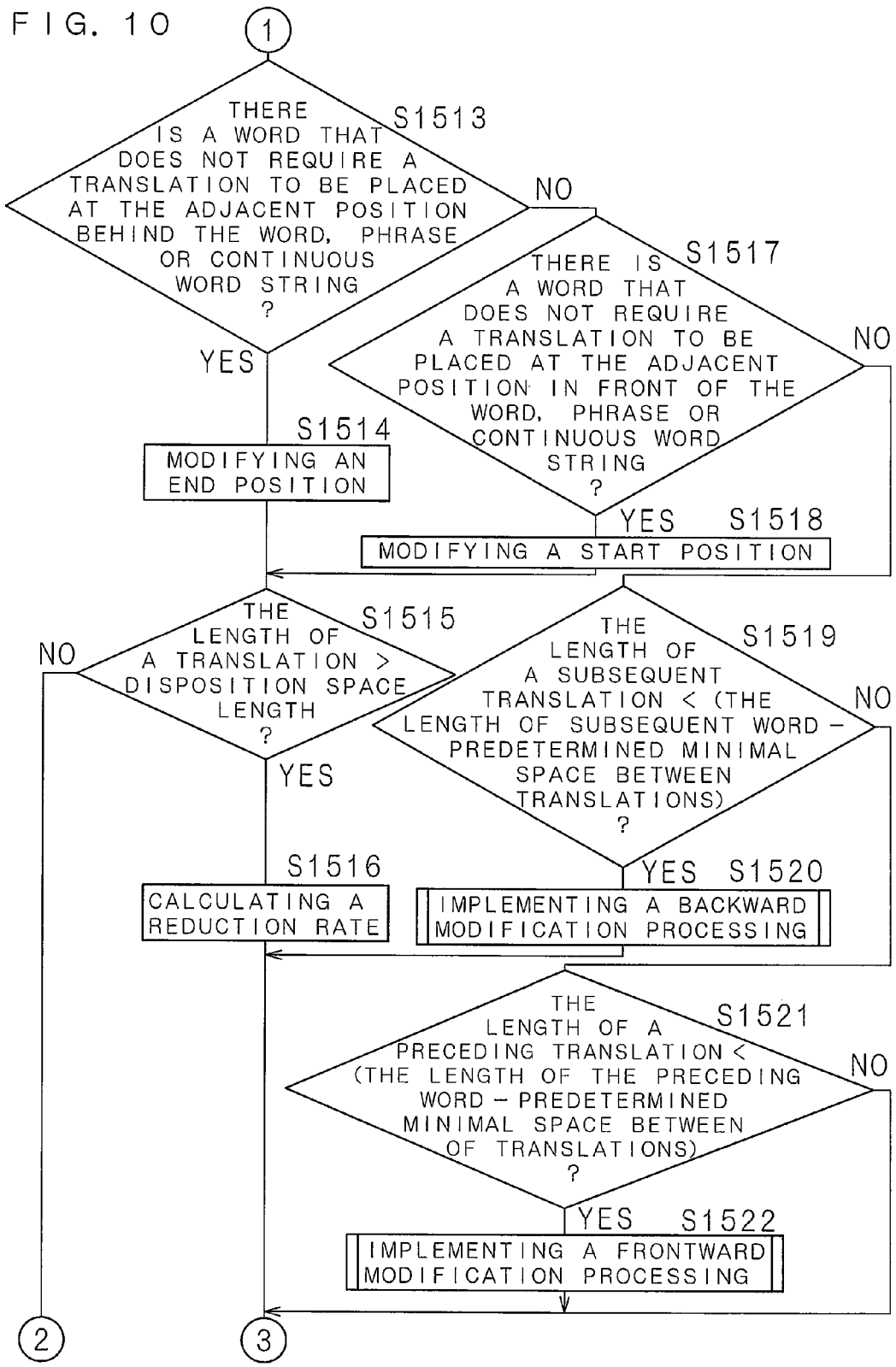
FIG. 10 is a flowchart showing a procedure of additional information determination processing at step S15.

Then, the CPU 11 performs the additional information determination processing on the respective obtained translations, to determine additional information that represents an arrangement condition of a translated word and phrase, such as a position and a size of the translated word and phrase to be arranged in a supplementary annotation added document image (S15). FIG. 9 and FIG. 10 are flowcharts showing procedures of additional information determination processing at step S15. The CPU 11 calculates the magnitude of interline spacing, on the basis of the character data, between respective lines included in the document (S1501). At step S1501, the CPU 11 obtains Y coordinates at the top edge and the bottom edge of a character that is positioned at the head of each line, and calculates the difference from a Y coordinate at the bottom edge of character that is positioned at the head of a line to a Y coordinate at the top edge of character that is positioned at the head of the next line, in order to calculate the magnitude of interline spacing. The CPU 11 stores the calculated magnitude of interline spacing in the RAM 12 in association with each line. Next, the CPU 11 selects one of translated word or phrase from the obtained translated words or phrases (S1502).

Next, the CPU 11 determines whether or not the selected translation at step S1502 is a translation of a discontinuous phrase (S1503). When having determined that the selected translation is a translation of a discontinuous phrase (S1503: YES), the CPU 11 determines a word or a continuous word string, from words and continuous word strings included in the discontinuous phrase to be translated, close to which the translation in the interline space should be placed (S1504). At step S1504, the CPU 11 compares the lengths of a word at the head, a continuous word string or a longest word included in the discontinuous phrase, with one another, and determines one word or continuous word string whose length is the longest as the word or continuous word string to be positioned near the translation. A word space included in the continuous word string may be utilized as one character for the comparison of length. It may be easier to understand the relationship between a translation and a discontinuous phrase, when the translation is placed near a longest possible word or continuous word string. Additionally, in the case that the user reads a sentence sequentially from the head, it may be easier to understand the meaning of the sentence, when the translation of a discontinuous phrase is placed closer to the word at the head. Therefore, the processing at step S1504 determines the arrangement position of a translation, which facilitates understanding of the meaning of the discontinuous phrase.

When having determined at step S1503 that the selected translation is not a translation of a discontinuous phrase (S1503: NO) or the step S1504 is completed, the CPU 11 determines the font size of the translation (S1505). At step S1505, the CPU 11 obtains the magnitude of line spacing between a line including the word, phrase or continuous word string close to which the translation should be placed and the next line, and compares the obtained magnitude of line spacing with the font size of the word, phrase or continuous word string close to which the translation should be placed. In the case that the magnitude of line spacing is less than 40% of the font size of the word, phrase or continuous word string, the CPU 11 determines the font size of the translation to be 40% of the font size of the word, phrase or continuous word string. In the case that the magnitude of line spacing is more than 80% of the font size of the word, phrase or continuous word string, the CPU 11 determines the font size of the translation to be 80% of the font size of the word, phrase or continuous word string. In the case that the magnitude of line spacing is not less than 40% and not more than 80% of the font size of the word, phrase or continuous word string, the CPU 11 determines the font size of the translation to be the same as the magnitude of line spacing. Alternatively, values other than 40% and 80%, may be utilize as the thresholds.

As shown at step S1505, the font size of the translation is determined independently for each word or phrase. Therefore, it is possible to prevent the placed translation from overlaying onto the characters in respective lines, even in the case that the magnitude of line spacing vary in a document, for example, due to distortion of a line that could occur at the time of reading of the document. Alternatively, the font size of a translation may be determined independently for each line, instead for each word or phrase. In the alternative case, the font size of a translation does not vary in one line. Therefore, it is possible to improve the aesthetic appearance of a document with a translation placed in an interline space. Alternatively, the font size of a translation may be determined independently for each character region utilized for recognizing characters. In this alternative case, the font sizes of a translation are unified in each character region, such as each paragraph. Therefore, it is possible to improve the aesthetic appearance of a document with a translation placed in an interline space.

Then, the CPU 11 sets a start position and an end position that are arranged within the interline space near the original selected word or phrase (S1506). The start position is a position at which the translation that is written along the line direction is to be placed and the end position is a position up to which a translation can be arranged. The start position represents the head position of a placed translation, and the end position represents a limit position that defines a limitation, so that the translation is not placed at the back of the end position. At step S1506, the start position is set by the CPU 11 to be a X coordinate of the left side of the first character in the word, phrase or continuous word string close to which the translation should be placed, and the end position is set by the CPU 11 to be a X coordinate of the right side of the last character in the word, phrase or continuous word string close to which the translation should be placed. In the case that the phrase has a line feed in the middle of it, the CPU 11 sets the end of the line as the end position. Alternatively, the start position in the present invention may be set to be a position shifted by a predetermined distance from the left side of the first character in the word, phrase or continuous word string, and the end position may be set to be a position shifted by a predetermined distance from the right side of the last character in the word, phrase or continuous word string. In the case that the start position and end position are already set before the step S1506, the CPU 11 utilizes the set start position and end position at step S1506.

Next, the CPU 11 multiplies the number of characters in the translation by the font size in order to calculate the length of the translation, substrates the value of the start position from the value of the end position in order to calculate the length of a disposition space required for disposing the translation, and determines whether the length of the translation is longer than the length of the disposition space or not (S1507). When having determined that the length of the translation is not longer than the disposition space length (S1507: NO), the CPU 11 determines the reduction rate for the length of the translation to be "1" (S1508). In other words, the translation is placed in the document without a reduction in its size. Next, the CPU 11 determines a position in a direction across the line at which the translation is to be placed within the interline space near the selected original word or phrase (S1509). At step S1509, the CPU 11 obtains Y coordinates of bottom sides of all the characters included in the word, phrase or continuous word string close to which the translation should be placed, averages all the values of the obtained Y coordinates, and determines a position that is shifted downward by the magnitude corresponding to the font size of the translation from the value of the averaged Y coordinate to be the position in the direction across the line for placing the translation. Through the step S1509, the position for disposing the translation in the supplementary annotation added document is determined within the interline space near the word, phrase or continuous word string in the document. Through the procedure from the step S1505 to the step S1509, the additional information is determine to represent the font size, arrangement position and reduction rate of the translation selected at step S1502.

After completion of step S1509, the CPU 11 determines whether or not there is a translation whose additional information is not determined yet (S1510). When having determined that there is a translation whose additional information is not determined yet (S1510: YES), the CPU 11 returns the procedure to the step S1502 and selects one translation whose additional information is not determined yet. When having determined that there is no translation whose additional information is not determined yet (S1510: NO), the CPU 11 completes the additional information determination processing.

When having determined that the length of translation is longer than the disposition space length (S1507: YES), the CPU 11 divides the value of the disposition space length by the value of the length of the translation in order to calculate the reduction rate of the length of the translation (S1511). Next, the CPU 11 determines whether the calculated reduction rate is smaller than a predetermined threshold or not (S1512). The threshold of the reduction rate is previously determined to be a specific value not larger than "1", and is included in the computer program 21 or is stored in the storing section 14. When having determined that the calculated reduction rate is not smaller than the predetermined threshold (S1512: NO), the CPU 11 proceeds with the procedure to the step S1509.

When having determined that the calculated reduction rate is smaller than the predetermined threshold (S1512: YES), the CPU 11 determines whether or not there is a word in the middle of the line, that does not require a translation to be placed at the interline space at the adjacent position behind the word, phrase or continuous word string close to which the translation should be placed (S1513). When having determined that there is a word at the subsequent position which does not require translation in the interline space (S1513: YES), the CPU 11 sets a X coordinate of the right edge of the last character in the subsequent word as the end position, in order to modify the end position (S1514). Next, the CPU 11 calculates the space length required for disposing the translation, and determines whether the length of the translation is longer than the calculated space length or not (S1515). When having determined that the length of the translation is not longer than the calculated space length (S1515: NO), the CPU 11 proceeds the procedure to the step S1508. When having determined that the length of the translation is longer than the disposition space length (S1515: YES), the CPU 11 divides the value of the disposition space length by the value of the length of the translation in order to calculate the reduction rate of the length of the translation (S1516), and then proceeds with the procedure to the step S1509.

When having determined at step S1513 that there is no word at the subsequent position which does not require a translation in the interline space (S1513: NO), the CPU 11 determines whether or not there is a word, in the middle of the line, that does not require a translation to be placed at the interline space at the adjacent position in front of the word, phrase or continuous word string close to which the translation should be placed (S1517). When having determined that there is a word at the preceding position which does not require a translation in the interline space (S1513: YES), the CPU 11 shifts the start position forward within a region behind the center position of the preceding word, in order to modify the start position (S1518). At the step S1518, in the case, for example, that a value obtained by subtraction of the disposition space length from the length of the translation is smaller than the length from the center position of the preceding word to the start position, the CPU 11 shifts the start position forward by the value obtained by subtraction of the disposition space length from the length of the translation. For example, in the case that the value obtained by subtraction of the disposition space length from the length of the translation is not smaller than the length from the center position of the preceding word to the start position, the CPU 11 shifts the start position backward by the specified amount from the center position of the preceding word. In the case the start position is shifted forward too much, the relationship becomes unclear between the translation and the original word or phrase. Therefore, the start position at step S1518 is preferred to be shifted backward from the center position of the preceding word. After completion of the step S1518, the CPU 11 proceeds with the procedure to the step S1515.

When having determined that there is no word at the preceding position that does not require a translation in the interline space (S1513: YES), the CPU 11 determines whether the word, phrase or continuous word string close to which the translation should be placed is not placed at the end of the line, and the length of the translation to be placed near the word at the adjacent position behind the word, phrase or continuous word string is shorter than a value obtained by subtraction of a predetermined minimal space between translations from the length of subsequent word (S1519). This minimal space between translations is a lower limit of a space length required between translations for distinguishing one translation from another translation arranged in the document. The minimal word space may be previously determined or set on the basis of the font size of a translated word or phrase. When having determined that the length of the subsequent translation is shorter than a value obtained by subtraction of the the minimal word space between translations from the length of the subsequent word (S1519: YES), the CPU 11 shifts backward the position for disposing the translation, in order to implement a backward modification processing for shifting further backward the end position which allows the selected translation to be placed (S1520).

Figure 11:
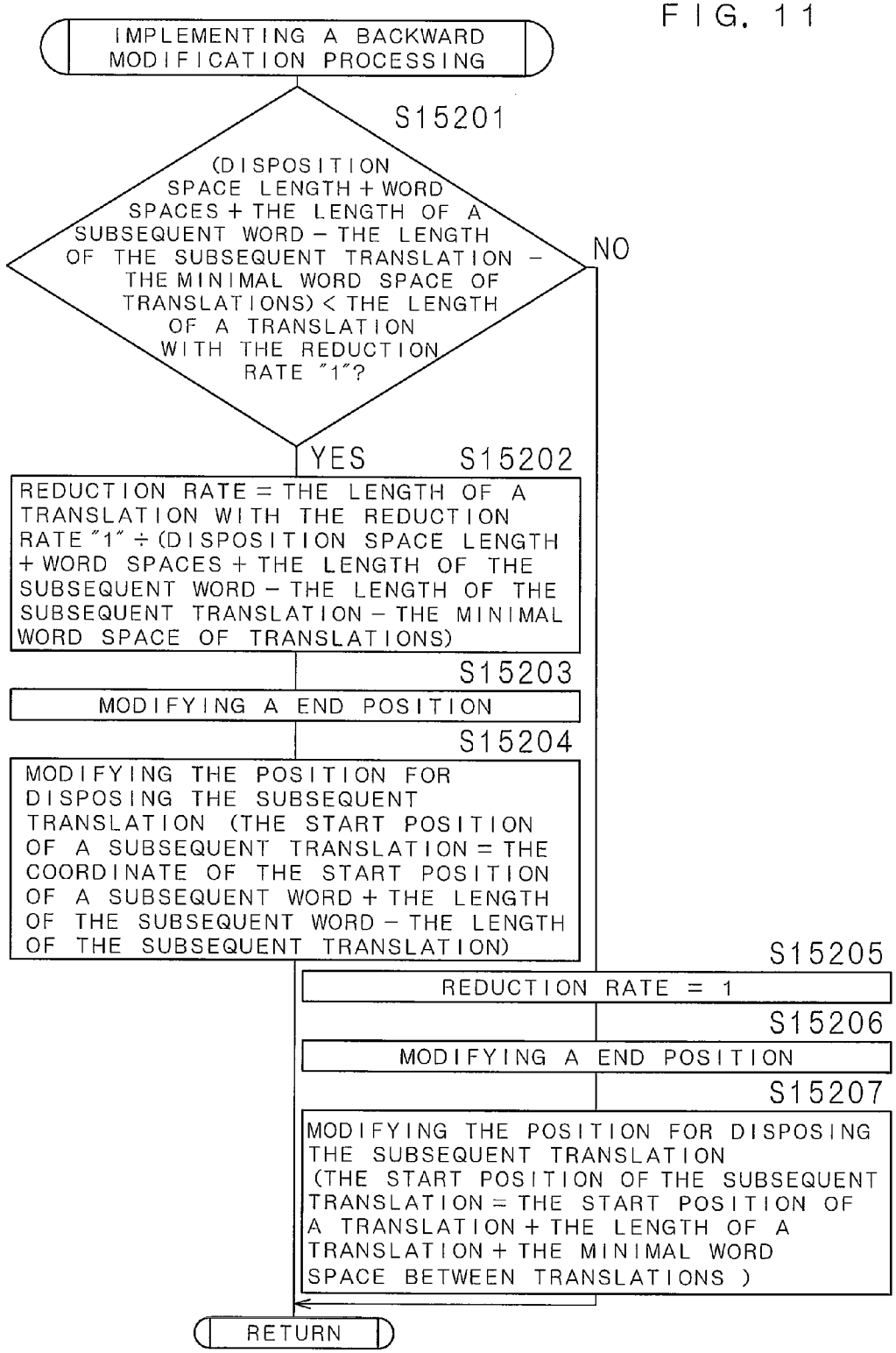
FIG. 11 is a flowchart showing a procedure of backward modification processing.

FIG. 11 is a flowchart showing a procedure of backward modification processing. The CPU 11 determines whether or not a value obtained by subtraction of the length of the subsequent translation and the minimal word space of translations from the sum of the current disposition space length, word spaces in the line and the length of the subsequent word is shorter than the length of the selected translation with the reduction rate "1" (S15201). When having determined that said value is smaller than the length of the selected translation with the reduction rate "1" (S15201: YES), the CPU 11 divides the length of the selected translation with the reduction rate "1" by a value obtained by subtraction of the length of the subsequent translation and the minimal word space of translations from the sum of the current disposition space length, word spaces in the line and the length of the subsequent word, in order to calculate the reduction rate of the length of the translation (S15202). Then, the CPU 11 multiplies the length of the translation having the reduction rate "1" by the calculated reduction rate in order to calculate a length of the translation, adds the calculated length onto the coordinate of the translation, and sets the added coordinate to be the coordinate of the end position in order to modify the end position of the translation (S15203). Then, the CPU 11 adds the length of the subsequent word onto the coordinate of the start position of the subsequent word and subtracts the length of the subsequent translation from the coordinate obtained by the addition, and thus sets the calculated coordinate as the start position of the subsequent translation in order to modify the position for disposing the subsequent translation (S15204).

When having determined at step S15201 that a value obtained by subtraction of the length of the subsequent translation and the minimal space between of the translations from the sum of the current disposition space length word spaces in the line and the length of the subsequent word is not smaller than the length of the selected translation with the reduction rate "1" (S15021: NO), the CPU 11 determines the reduction rate of the length of the translation to be "1" (S15205). Next, the CPU 11 adds the length of the translation having the reduction rate "1" onto the coordinate of the start position of the translation, and sets the added coordinate as the coordinate of the end position in order to modify the end position of the translation (S15206). Then, the CPU 11 adds both the length of the translation and the minimal word space between translations onto the coordinate of the start position of the translation, and sets the added coordinate as the start position of the subsequent translation in order to modify the position for disposing the subsequent translation (S15207). After completion of step S15204 or step S15207, the CPU 11 completes the backward modification processing and returns the procedure to the additional information determination processing. After completion of the backward modification processing at step S1520, the CPU 11 proceeds with the procedure to the step S1509.

When having determined at step S1509 that the position of the word, phrase or continuous word string is at the end of a line or the length of the subsequent translation is not smaller than a value obtained by subtraction of the minimal space between translations from the length of the subsequent word (S1519: NO), the CPU 11 determines whether the word, phrase or continuous word string close to which the translation should be placed is not placed at the head of the line and the length of the translation to be placed near the word at the adjacent position in front of the word, phrase or continuous word string is smaller than a value obtained by subtraction of a predetermined minimal space between of translations from the length of the preceding word (S1521). When having determined that the length of the preceding translation is smaller than a value obtained by subtracting the minimal space between translations from the length of the adjacent (preceding) word (S1521: YES), the CPU 11 implements the frontward modification processing that shifts frontward the start position which allows arrangement of the selected translation (S1522).

Figure 12:
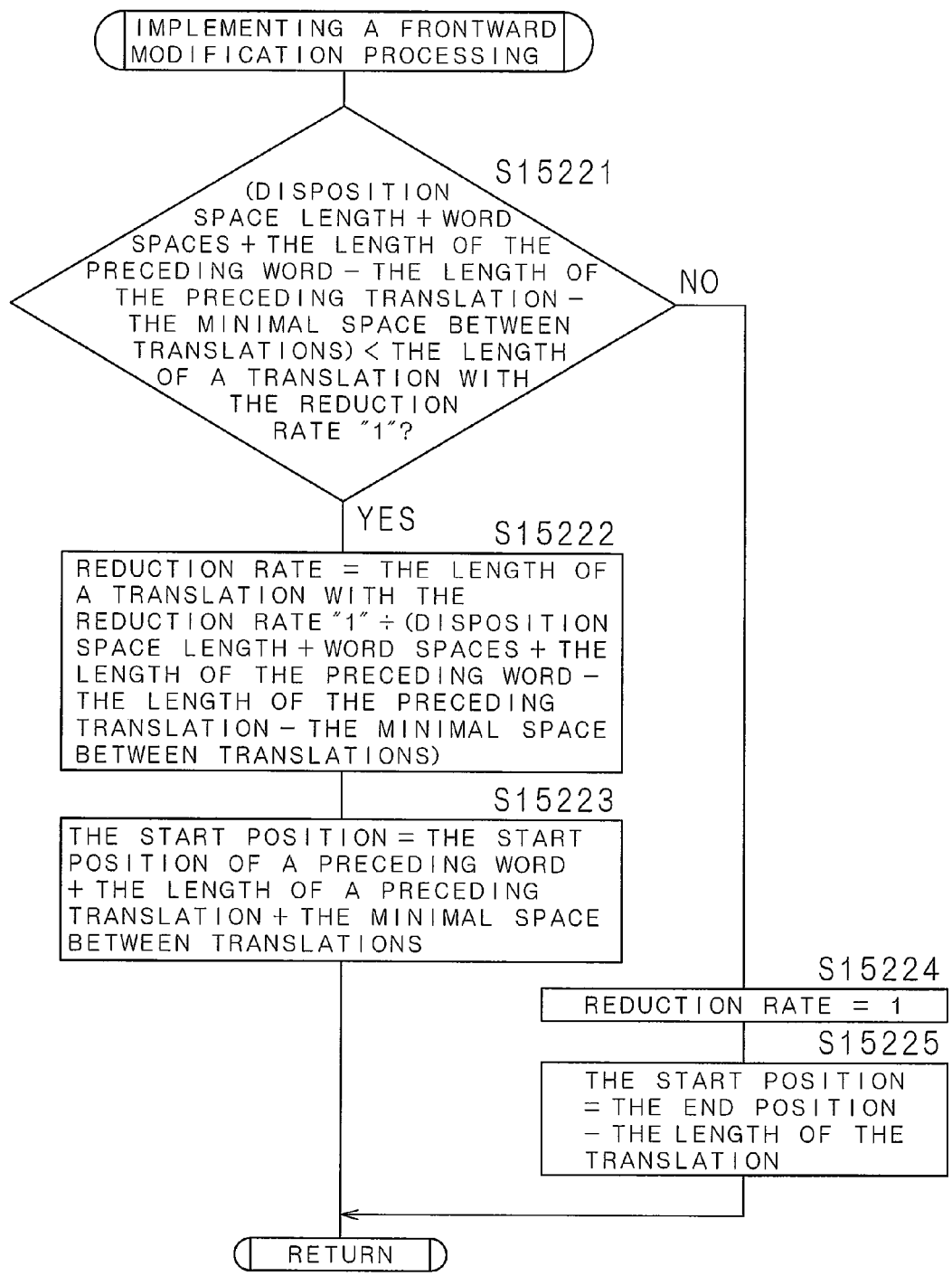
FIG. 12 is a flowchart showing a procedure of frontward modification processing.

FIG. 12 is a flowchart showing a procedure of frontward modification processing. The CPU 11 determines whether or not a value obtained by subtraction of the length of the preceding translation and the minimal space between translations from the sum of the current disposition space length, word spaces in the line and the length of the preceding word is smaller than the length of the selected translation with the reduction rate "1" (S15221). When having determined that said value is smaller than the length of the selected translation with the reduction rate "1" (S15221: YES), the CPU 11 divides the length of the selected translation with the reduction rate "1" by a value obtained by subtraction of the length of the preceding translation and the minimal space between translations from the sum of the current disposition space length, word spaces in the line and the length of the preceding word, in order to calculate the reduction rate of the length of the translation (S15222). Then, the CPU 11 adds both the length of the preceding translation and the minimal space between translations onto the coordinate of the start position of the preceding word, and sets the added coordinate as the start position of the transition in order to modify the start position of the selected translation (S15223).

When having determined at step S15221 that a value obtained by subtracting the length of the preceding translation and the minimal space between translations from the sum of the current disposition space length, word spaces in the line and the length of the preceding word is not smaller than the length of the selected translation with the reduction rate "1" (S15021: NO), the CPU 11 determines the reduction rate of the length of the translation to be "1" (S15224). Next, the CPU 11 subtracts the length of the translation having the reduction rate "1" from the coordinate of the end position of the translation, and sets the subtracted coordinate as the coordinate of the start position in order to modify the start position of the translation (S15225). After completion of step S15223 or step S15225, the CPU 11 completes the frontward modification processing and returns the procedure to the additional information determination processing. After completion of the frontward modification processing at step S1522, the CPU 11 proceeds with the procedure to the step S1509. When having determined at step S1521 that the word, phrase or continuous word string close to which the translation should be placed is placed at the head of the line, or that the length of the preceding translation is smaller no less than a value obtained by subtraction of the minimal space between translations from the length of the preceding word (S1521: NO), the CPU 11 proceeds with the procedure to the step S1509, too.

In the case that the length of a translation is longer than the length of word, phrase or continuous word string close to which the translation should be placed, the length of the translation is reduced by the procedure at the step S1507 and the subsequent step, in order to place the translation within the determined disposition space. The reduction of length of the translation prevents the placed translation from overlaying another translation, and contributes to the clarification of the relationship between the original word or phrase and the translated word or phrase become clear. In the case that there is no word which requires disposition of a translation at the preceding or subsequent position, the arrangement position of the translation in the direction along the line is specified not only at a position in the interline space near the word, phrase or continuous word string close to which the translation should be placed, but also at a position in the interline space near the preceding or subsequent word. Thus, the translation may be placed near the preceding and subsequent word. Therefore, it is possible to prevent the length of the translation from being reduced extremely, and to place the translation with the easy-to read size. FIG. 13 is a schematic view showing an example in the case that the length of a translated word is longer than a length of an original word. FIG. 13A shows an example where the translated word is reduced and placed, and FIG. 13B shows an example where the translated word is placed at a position in the interline space even close to the preceding or subsequent word. The translated word for the word "show" is longer and the subsequent word "an" does not require disposition of a translated word. Therefore, the translated word for the original word "show" is placed at the position near the subsequent word "an" in the example shown in FIG. 13B, whose font size is more readable than the font size of the translation shown in FIG. 13A.

Assume the case that the processing is performed with the above described procedure, in which both the preceding word and the subsequent word respectively require disposition of their translations but the lengths of the translation placed near the preceding and subsequent words is sufficiently shorter than the length of the original words, it is possible to set the arrangement position in the direction along the line to include not only the interline space near the word, phrase or continuous word string close to which the translation should be placed, but also the interline space near the preceding and subsequent words. FIG. 14 is a schematic view showing examples in the case that the length of a translation is longer than the length of an original phrase. In this example, near an original phrase "identified as", its japanese translation "〜が〜であると認識する" is placed. FIG. 14A shows an example where the translation is placed in a part of the interline space near the subsequent word. In the case that the translation is placed even at a part of the interline space near the subsequent word, the end position of the translation must be shifted backward, and further the arrangement position of a translation to be placed near the subsequent word must be shifted backward. FIG. 14B shows an example where the translation whose length is reduced is placed even in the interline space near the subsequent word. In the case that the end position of the translation is shifted backward and the length of the translation is still longer than the arrangement space, the translation should be reduced. FIG. 14C shows an example where the translation is placed even in a part of the interline space near the preceding word. In the case that the translation is placed even in a part of the interline space near the preceding word, the arrangement position of the translation for the preceding word is not changed, but the start position of the translated phrase is shifted forward. FIG. 14D shows an example where the translation whose length is reduced is placed even at a part of the interline space near the preceding word. In the case that the start position of translated phrase is shifted forward and the length of the translation is still longer than the arrangement space, the translation should be reduced. Thus, even in the case that the preceding and subsequent words respectively require disposition of their translation, the translated phrase is placed even in regions near the preceding and subsequent words within an extent that the relationship between the original word and the translated word is kept to be clear. Therefore, it is possible to prevent the length of a translation from being reduced extremely, and to keep the size of the translation to be readable. Alternatively, the present invention may be configured with the additional information determination processing omitting the processing from the step S1519 to the step S1522. In such the alternative case, the procedure may proceed to the step S1509 when the step S1517 is NO.

Although the additional information determination processing described above modifies the start position or end position of a translation, the present invention may be configured to modify both the start position and end position of the translation. The following will be a description about the additional information determination processing that can modify both the start position and end position of a translation. Even in the additional information determination processing that can modify both the start position and end position of a translation, a similar procedure which is described in step S1501 to step S1512 in the flowchart of FIG. 9 is performed. FIG. 15A and FIG. 15B are flowchart showing a procedure after the step S1512 of additional information determination processing that can modify both the start position and the end position of the translation.

When having determined that the calculated reduction rate is smaller than a predetermined threshold (S1512: YES), the CPU 11 determines whether or not there is a word which does not require disposition of its translation, at an adjacent position behind the word, phrase or continuous word string close to which the translation should be placed (S1531). When having determined that there is a word at the subsequent position which does not require disposition of its translation in the interline space (S1531: YES), the CPU 11 sets a X coordinate of the right edge of the last character of the subsequent word as the end position of the translation in order to modify the end position of the translation, and calculates the reduction rate for the length of the translation (S1532). At step S1532, the CPU 11 determines whether the length of the translation is longer than the arrangement space length or not. When having determined that the length of the translation is longer than the arrangement space length, the CPU 11 divides the value of the arrangement space length by the value of the length of the translation in order to calculate the reduction rate. When having determined that the length of the translation is not longer than the arrangement space length, the CPU 11 determines the reduction rate to be "1". Then, the CPU 11 determines whether the calculated reduction rate is smaller than a predetermined threshold or not (S1533). When having determined that the calculated reduction rate is not smaller than the predetermined threshold (S1533: NO), the CPU 11 proceeds with the procedure to the step S1509.

When having determined that the calculated reduction rate is smaller than the predetermined threshold (S1533: YES), the CPU 11 determines whether or not there is a word in the middle of line and at an adjacent position in front of the word, phrase or continuous word string close to which the translation should be placed, which does not require disposition of its translation in the interline space (S1534). When having determined that there is a word at the front position which does not require disposition of its translation in the interline space (S1534: YES), the CPU 11 shifts the start position forward within a range behind the center position of the preceding word, in order to modify the start position of the translation, and calculates the reduction rate of the length of the translation (S1535). Then, the CPU 11 proceeds with the procedure to the step S1509.

When having determined at step S1531 that there is no word at the back position which does not require disposition of its translation in the interline space (S1531: NO), the CPU 11 determines whether or not there is a word in the line and at an adjacent position in front of the word, phrase or continuous word string close to which the translation should be placed, which does not require disposition of its translation (S1536). When having determined that there is a word at the front position which does not require disposition of its translation (S1536: YES), the CPU 11 modifies the start position of the translation of the word, phrase or continuous word string and calculates the reduction rate of the length of the translation (S1537). Then, the CPU 11 determines whether the calculated reduction rate is smaller than a threshold or not (S1538). When having determined that the calculated reduction rate is not smaller than the threshold (S1538: NO), the CPU 11 proceeds with the procedure to the step S1509. When having determined that the calculated reduction rate is smaller than the threshold (S1538: YES), the CPU 11 determines whether the word, phrase or continuous word string close to which the translation should be placed is not positioned at the end of the line and the length of the translation to be placed near the subsequent word is smaller than a value obtained by subtraction of a predetermined minimal space between translations from the length of the adjacent word behind said word, phrase or continuous word string (S1539). When having determined that the word, phrase or continuous string close to which the translation should be placed is positioned at the end of the line or the length of the translation of the subsequent word is not smaller than a value obtained by subtraction of a predetermined minimal space between translations from the length of the subsequent word (S1539: NO), the CPU 11 proceeds with the procedure to the step S1509. When having determined that the length of the translation of the subsequent word is smaller than a value obtained by subtraction of a predetermined minimal space between translations from the length of the subsequent word (S1539: YES), the CPU 11 performs the backward modification processing (S1540). The backward modification processing of step S1540 performs processing similar to the backward modification processing of step S1520 shown in the flowchart of FIG. 11. After completion of step S1540, the CPU 11 proceeds with the procedure to the step S1509.

When having determined at step S1536 that there is no word at the front position which does not require disposition of its translation (S1536: NO), the CPU 11 determines whether the word, phrase or continuous string close to which the translation should be placed is not positioned at the end of line and the length of translation to be placed near the subsequent word is smaller than a value obtained by subtraction of the predetermined minimal space between translations from the length of the subsequent word (S1541). When having determined that the length of the translation of the subsequent word is smaller than a value obtained by subtraction of the predetermined minimal space between translations from the length of the subsequent word (S1541: YES), the CPU 11 performs the backward modification processing (S1542). The backward modification processing of step S1542 performs processing similar to the backward modification processing of step S1520 shown in the flowchart of FIG. 11. Then, the CPU 11 determines whether the reduction rate calculated by the backward modification processing of step S1542 is smaller than a threshold or not (S1543). When having determined that the calculated reduction rate is not smaller than the threshold (S1543: NO), the CPU 11 proceeds with the procedure to the step S1509.

When having determined at step S1534 that there is no word at the front position which does not require disposition of its translation in the interline space (S1534: NO), when having determined at step S1541 that the word, phrase or continuous string close to which the translation should be placed is positioned at the end of line or the length of the translation of the subsequent word is not smaller than a value obtained by subtraction of the predetermined minimal space between translations from the length of subsequent word (S1541: NO), or when having determined at step S1543 that the calculated reduction rate is smaller than the threshold (S1543: YES), the CPU 11 determines whether the word, phrase or continuous word string close to which translation should be placed is not positioned at the head of the line and the length of the translation to be placed near the preceding word is smaller than a value obtained by subtraction of the minimal space between translations from the length of a word preceding to the word, phrase or continuous word string (S1544). When having determined that the word, phrase or continuous word string close to which translation should be placed is not positioned at the head of line or the length of the translation of the preceding word is not smaller than a value obtained by subtraction of the minimal space between translations from the length of preceding word (S1544: NO), the CPU 11 proceeds with the procedure to the step S1509. When having determined that the length of the translation of the preceding word is smaller than a value obtained by subtraction of the minimal space between translations from the length of the preceding word (S1544: YES), the CPU 11 performs the frontward modification processing (S1545). The frontward modification processing of step S1545 performs processing similar to the frontward modification processing of step S1522 shown in the flowchart of FIG. 12. Then, the CPU 11 proceeds with the procedure to the step S1509.

The processing from the step S1531 to the step S1514 implement to modify the start position and the end position of a translation. FIG. 16 is a schematic view showing an example in the case that the length of a translated phrase is longer than the length of an original phrase and other translated words are placed in front of and behind the translated phrase. In the example of FIG. 16, the translated phrase is placed even in a part of the interline space near the subsequent word, and even in a part of the interline space near the preceding word. With the arrangement that the translation is placed in the interline space near the preceding and subsequent words as illustrated, it is possible to place the translation in a readable size, through preventing the reduction as much as possible.

After the CPU 11 completes the additional information determination processing of the step S15 as described above, the CPU 11 stores the translation included in the translation data in the RAM 12 in association with the generated additional information, and then returns the procedure to the main processing. The processing from the step S13 to the step S15 are performed on the respective character regions extracted at step S12.

Figure 17:
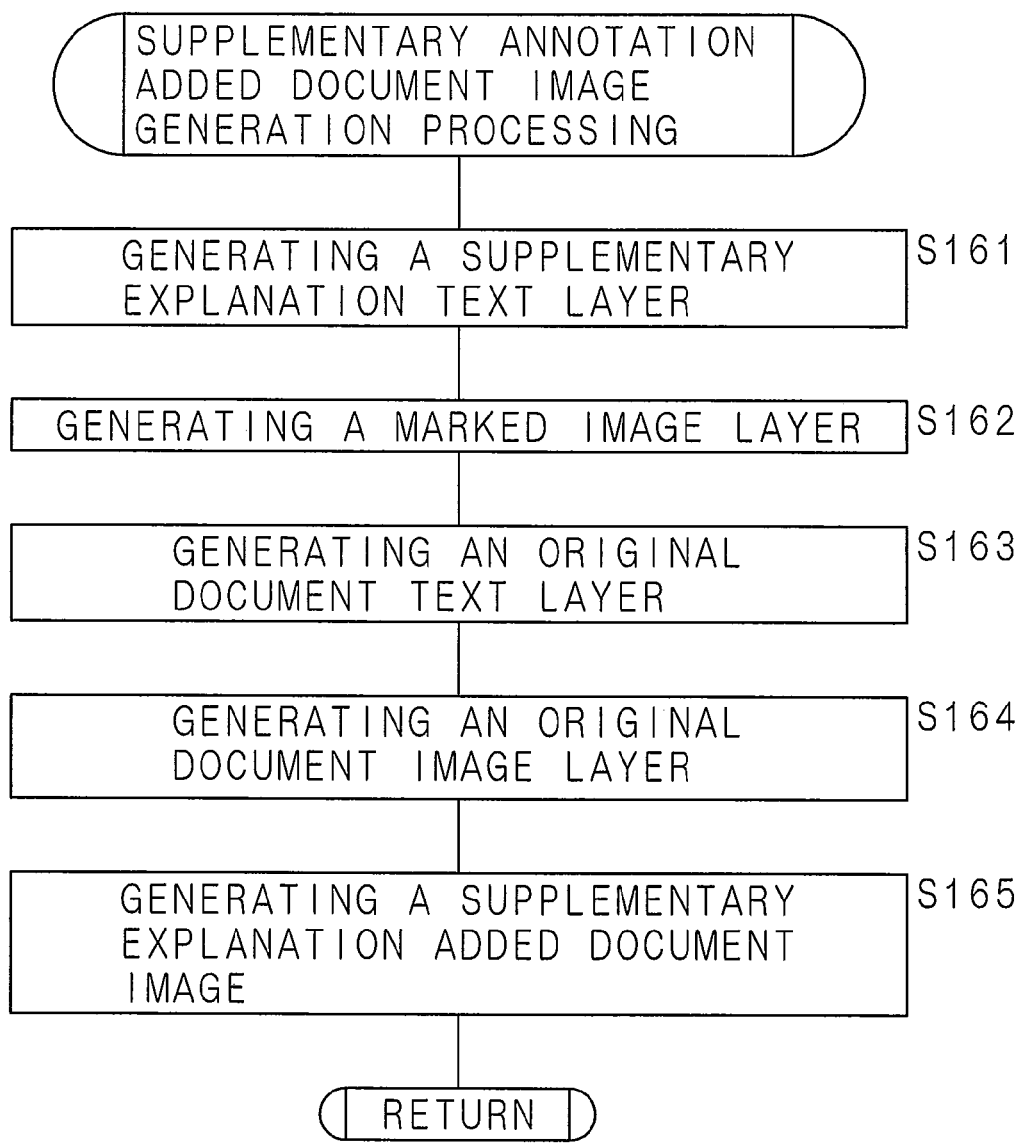
FIG. 17 is a flowchart showing a procedure of supplementary annotation added document image generation processing at a step S16.

Next, the CPU 11 performs the supplementary annotation added document image generation processing for generating a supplementary annotation added document image in which respective translations are placed in the original image on the basis of the arrangement condition represented by the additional information (S16). FIG. 17 is a flowchart showing a procedure of supplementary annotation added document image generation processing at step S16. The CPU 11 firstly generates a supplementary annotation text layer in which respective translations included in the translation data is placed in a size indicated by the additional information at the arrangement positions represented by the additional information in a layer whose size is the same as the size of the original document image (S161). To be more specific, the CPU 11 reduces the length of the translation generated in the font size represented by the additional information, and generates an image in which the text of each translation is arranged so that the left end of a head character of the translation is set to be the start position, and the translation is placed to make its bottom end cross the line in the generated image. At step S161, a region excluding the text data of translation is transparent in the generated supplementary annotation text layer. Then, the CPU 11 generates a marked image layer (S162). The marked image layer is configured to include a mark that indicates a discontinuous phrase in the image whose size is the same as the size of the original document image, and the mark is a straight underline to be placed under a discontinuous phrase for which the translation is generated. At step S162, a region excluding the straight underline is kept to be transparent in the generated marked image layer.

Figure 18A:
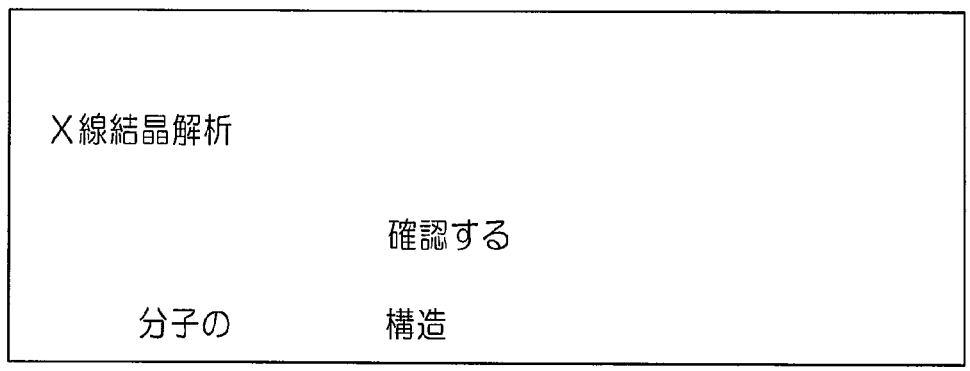
FIG. 18 is a schematic view showing examples of a supplementary annotation text layer and a marked image layer.
Figure 18B:
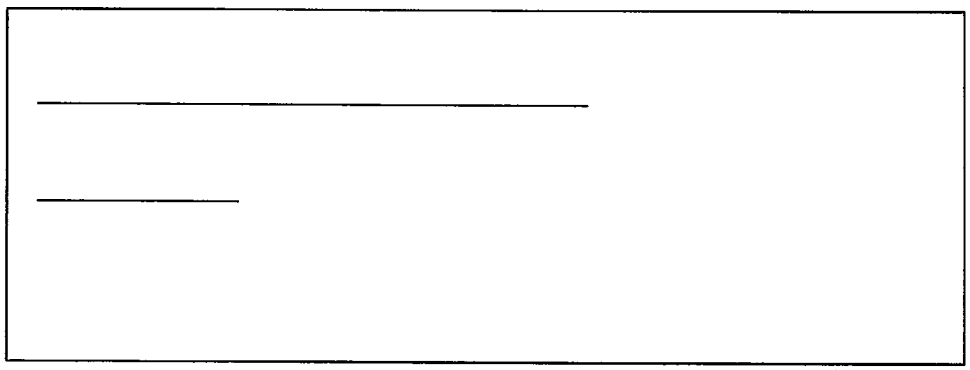

FIG. 18 is a schematic view showing examples of the supplementary annotation text layer and marked image layer. The supplementary annotation text layer and the marked image layer shown in FIG. 18 are generated from the original document image shown in FIG. 2. FIG. 18A shows the supplementary annotation text layer at which translations for words and phrases in the original document image are placed. FIG. 18B shows the marked image layer at which straight underlines are placed for the phrase "X-ray crystallographic analysis" included in the original document image. This original phrase is provided with the line feed in the middle of it, and thus becomes a discontinuous phrase. In the marked image layer, the straight underlines are placed in correspondence with the discontinuous phrase.

Next, the CPU 11 generates an original document text layer where the text data indicating respective characters included in the original document image are placed in a transparent state at the corresponding positions in the transparent layer whose size is the same as the size of the original document image (S163), and generates an original document image layer where the original document image is made to be an image layer (S164). Next, the CPU 11 superimposes the supplementary annotation text layer, the marked image layer and the original document text layer onto the original document image layer in order to generate a supplementary annotation added document image (S165), stores image data representing the generated supplementary annotation added document image in the RAM 12, and returns the procedure to the main processing. For example, the supplementary annotation added document image is generated at step S16 in the portable document format (PDF), the CPU 11 generates each layer in the PDF, and the generated supplementary annotation text layer, marked image layer and the original document text layer are superimposed on the original document image layer in order to generate a PDF type of supplementary annotation added document image. FIG. 2B shows the supplementary annotation added document image generated from the original document image shown in FIG. 2A on which the supplementary annotation text layer, the marked image layer and the transparent original document text layer shown in FIG. 18 are superimposed. Since the supplementary annotation added document image is generated from the original document image layer on which the supplementary annotation text layer and the original document text layer are superimposed, it is possible to search for the contents of the document and the translation with utilizing the supplementary annotation added document image, and to facilitate copying of the contents of the document and the contents of the translation. The marked image layer and the original document text layer are not essential for generating the supplementary annotation added document image. Thus, the processing at step S16 may alternatively generates the supplementary annotation added document image which does not include the marked image layer and/or the original document text layer, by superimposing at least the supplementary annotation text layer on the original document image layer.

Next, the CPU 11 sends the image data representing the supplementary annotation added document image from the interfacing section 17 to the image forming apparatus 32, makes the image forming apparatus 32 form the supplementary annotation added document image based on the image data (S17), and completes the document image generation processing according to the present invention. Alternatively, the processing in the present invention may display the supplementary annotation added document image on the displaying section 16 or may store the image data representing the supplementary annotation added document image in the storing section 14, instead of forming the supplementary annotation added document image at step S17.

Through the processing described above, the supplementary annotation added document image is generated as shown in FIG. 2B. Since the translations for the original words and a phrase included in the original document are respectively placed at the interline spaces near the original words and phrase, a user reading the document can understand the document in reference with the translations. FIG. 2B shows the example where the translation is placed at the bottom interline space, of the top and bottom interline spaces near the original words and phrase. Alternatively, the translation in the present invention may be placed at the interline space above the original word and phrase. Since the supplementary annotation added document image is generated from the original document image layer on which the supplementary annotation text layer is superimposed, the size and position of each character in the document are not changed, and thus it is possible to keep the layout of the document. Therefore, it is easy to compare the original document and the generated document provided with the translations, and to correctly understand the contents of the original document. Since the translated word and phrase for the original word and phrase are provided in the supplementary annotation added document image, instead of translated sentences for the whole of the original document, it is easy to understand the relationship between the original document and the translations. Even in the case that there is a misspelling of a word in the original document, a misrecognition of a character caused by the character recognition, a mistranslation caused by inadequate natural language processing or the like, it is easy to recognize the erroneous translation from the context before and after the erroneous translation because the generated document include only the erroneous translation. Therefore, it is unlikely that the error could seriously prevent the user from understanding the contents of the original document. Furthermore, the original document is not modified in the present invention. Thus, there are no chances to generate an original document whose contents are wrongly modified due to the misrecognition of the characters caused by the character recognition. Therefore, the user can properly understand the contents of original document.

As shown in FIG. 2B, the supplementary annotation added document image includes the translated phrase for the discontinuous phrase and the straight underline for the discontinuous phrase. Since the straight underline highlights the range of discontinuous phrase, the user can easily recognize the range of the discontinuous phrase and understand the meaning of the original document. It should be noted that the mark indicating a discontinuous phrase is not limited to a straight underline for highlighting the discontinuous phrase. Alternatively, the supplementary annotation added document image according to the present invention may be provided with the other marks, such as a wavy underline or same numerals attached to words that are included in a same discontinuous phrase. Furthermore, the supplementary annotation added document image according to the present invention may be provided with such a mark for indicating not only a discontinuous phrase but also a continuous phrase, in order to highlight the range of the phrase. In this case, it is preferred to prepare two different marks: a mark for a continuous phrase; and a mark for a discontinuous phrase.

In this embodiment, the document image generation apparatus 1 according to the present invention is illustrated to be a general-purpose computer connected with the image reading apparatus 31 and the image forming apparatus 32. Alternatively, the document image generation apparatus according to the present invention may be an image processing apparatus, such as a scanner or a multi-function machine having the image reading function. This embodiment is illustrated to implement the document image generation method according to the present invention based on the computer program 21. However, the present invention is not limited to this illustration. The document image generation apparatus according to the present invention may include an information processing circuit dedicated to perform a part or all of processing based on the document image generation method according to the present invention.

This embodiment is illustrated to perform the processing according to the present invention on an original document image generated by the image reading apparatus 31. Alternatively, the document image generation apparatus according to the present invention may perform the processing according to the present invention on an original document image obtained by another method. For example, the document image generation apparatus 1 may receive image data sent from the external by facsimile communication or e-mail and perform the processing based on the document image generation method. For example, the interfacing section 17 may be connected to a photograph apparatus, and the document image generation apparatus 1 may perform the processing, based on the document image generation method, on the original document image that is obtained through the shooting performed by the photograph apparatus.

Embodiment 2

Figure 19:
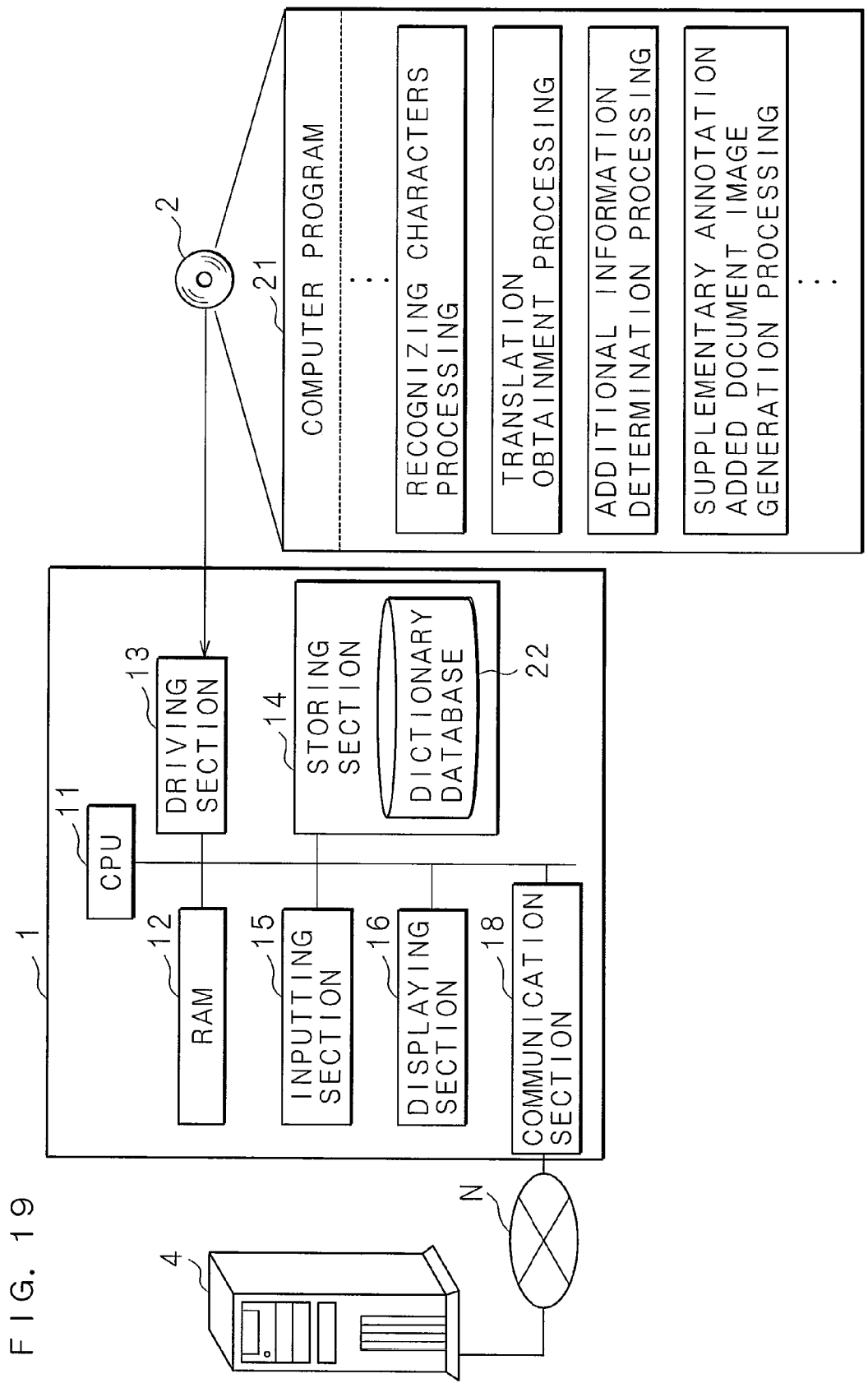
FIG. 19 is a block diagram showing the internal configuration of a document image generation apparatus according to embodiment 2 of the present invention.

FIG. 19 is a block diagram showing internal configuration of a document image generation apparatus 1 according to an embodiment 2 of the present invention. The document image generation apparatus 1 in the embodiment 2 includes a communication section 18 connected to an external Web server apparatus 4 through a communication network N. The communication section 18 receives data for a web page that is sent through the communication network N from the Web server apparatus 4, and the CPU 11 makes the displaying section 16 display a web page based on the received data. The other components of the document image generation apparatus 1 are similar to the embodiment 1, provided with the same numerals corresponding to the similar components of embodiment 1, and are not described in detail. The document image generation apparatus 1 in the embodiment 2 generates a translation for the original word or phrase included in the web page and adds the generated translation on the web page displayed by the displaying section 16.

Figure 20:
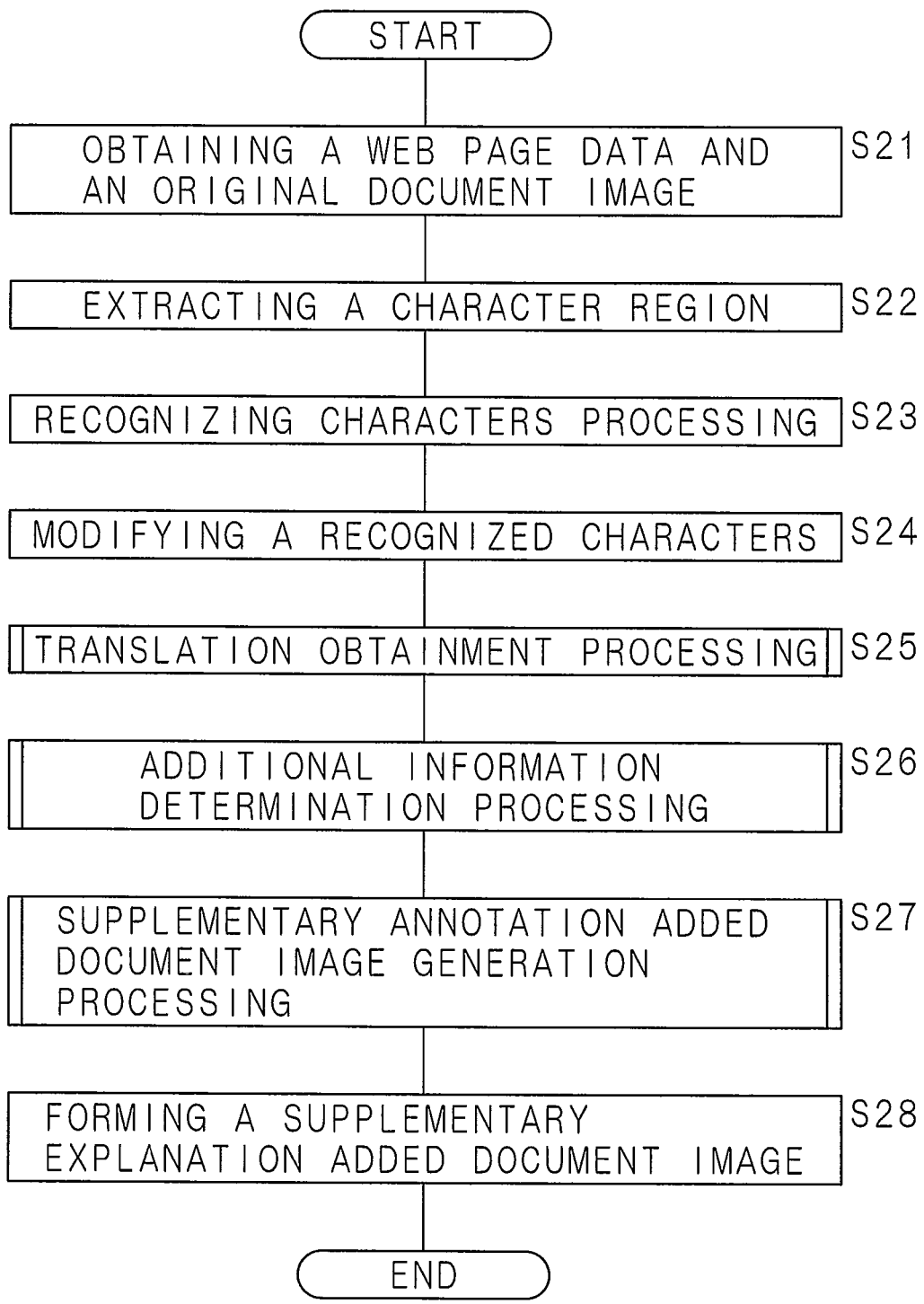
FIG. 20 is a flowchart showing a procedure performed by the document image generation apparatus according to the embodiment 2.

FIG. 20 is a flowchart showing a procedure performed by the document image generation apparatus 1 according to the embodiment 2. The CPU 11 performs the following processing based on the computer program 21 loaded into the RAM 12. The document image generation apparatus 1 receives the web page data sent from the Web server apparatus 4 through the communication network N at the communication section 18, and generates image data representing the original document image (i.e., the web page) based on the received web page data, to obtain the web page data and the original document image (S21). The CPU 11 stores the web page data and the image data representing the original document image into the RAM 12. Then, the CPU 11 extracts a character region including characters from the original document image that is represented by the image data stored in the RAM 12 (S22), and performs the character recognition on the characters included in the extracted character region (S23). The processing at step S22 is similar to the processing at step S12 in the embodiment 1, and the processing at step S23 is similar to the processing at step S13 in the embodiment 1.

Next, the CPU 11 extracts the text data from the web page data stored in the RAM 12, compares the extracted text data with the characters recognized at step S23, and modifies the recognized characters in conformity to the text data (S24). Alternatively, the processing at step S24 may be skipped, in the case that the text data cannot be extracted from the web page data because the web page data is e.g., image data. Then, the CPU 11 performs the translation obtainment processing, to obtain a translation for the original word or phrase included in the document configured from the recognized characters (S25), and performs the additional information determination processing to respectively set the additional information for the obtained translation (S26). The processing at step S25 is similar to the processing at step S14 in the embodiment 1, and the processing at step S26 is similar to the processing at step S15 in the embodiment 1.

Next, the CPU 11 performs the supplementary annotation added document image generation processing to generate a supplementary annotation added document image where the translation are respectively placed in the original document image on the basis of the arrangement condition set by the additional information (S27). The processing at step S27 is similar to the processing at step S16. Then, the CPU 11 displays the generated supplementary annotation added document image on the displaying section 16 (S28), and completes the processing of document image generation according to the present invention. The document image generation apparatus 1 may utilize an image forming apparatus (not shown) for forming a supplementary annotation added document image.

Through the processing described above, the displaying section 16 displays the supplementary annotation added document image where the translation for the word and phrase included in the web page is placed in the interline space. When browsing a web page, the user can easily understand the contents of the web page in reference with the translation, even in the case that the web page is written in a foreign language unfamiliar to the user. The supplementary annotation added document image is generated from an original document image layer (i.e., the original web page) on which a supplementary annotation text layer is superimposed. Therefore, the user can browse the web page which is provided with translations while the layout of the original web page is maintained.

The embodiments 1 and 2 are illustrated to obtain a supplementary annotation configured from a translation for a word or phrase, and to generate a supplementary annotation added document image where the translation is placed in an interline space. However, the supplementary annotation according to the present invention is not limited to a translation. For example, a supplementary annotation according to the present invention may be alternatively reading information explaining, with Japanese kana reading, phonetic alphabet, Pinyin or the like, how to read the word or phrase, which is placed in the interline space near the word or phrase. In this alternative configuration, the user reading the document can easily confirm how to read the word or phrase included in the document. For example, the supplementary annotation according to the present invention may be alternatively configured from an annotation explaining the meaning, synonyms, origin or the like of the word or phrase, which are placed in the interline space near the original word or phrase. In this latter alternative configuration, the user reading the document can easily understand a word, technical term and the like in the document which difficult even when it is written in the user's first language. In these alternative configurations, the document image generation apparatus 1 may previously record the reading information or annotation in the dictionary database 22 in association with the original word or phrase, and may appropriately obtain the reading information or annotation from the dictionary database 22.

Although the embodiments 1 and 2 are illustrated to apply the present invention to the horizontally written document, it is possible to apply the present invention to the vertically written document. For example, the processing according to the present invention may be alternatively applied to a horizontally written Japanese document. In this alternative case, it is preferred to dispose a translation in the interline space adjacent to the right side of the original word or phrase. In addition, although the embodiments 1 and 2 are illustrated to utilize the document image generation apparatus 1 including the dictionary database 22 stored in the internal storing section 14, the configuration is not limited to this, and the document image generation apparatus according to the present invention may alternatively utilize an external dictionary database for performing the processing according to the present invention. For example, such the dictionary database may be stored in a server apparatus external to the document image generation apparatus, and the document image generation apparatus may read necessary data from the external dictionary database as needed, in order to perform the processing according to the present invention.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A document image generation apparatus that generates, on the basis of an image representing a document including plural lines, an image representing a supplementary annotation added document in which a supplementary annotation corresponding to a word or a phrase composed of plural words included in the document is added, comprising:
   an original document image obtaining component configured to obtain an original document image representing a document, wherein the original document image obtaining component is configured to obtain the original document image from a scanner, and wherein further the document is a text document;
   a character recognizing component including a memory and processor configured to recognize a character included in the original document image obtained by the original document image obtaining component and identifies a position of the character in the original document image;
   a supplementary annotation obtaining component including a memory and processor configured to determine a meaning of a word or a phrase included in the document constructed of a plurality of the recognized characters by the character recognizing component through a natural language processing performed on the document, and obtains a supplementary annotation corresponding to the meaning of each word or phrase;
   a position determining component including a memory and processor configured to determine, as a position at which the obtained supplementary annotation corresponding to each word or phrase should be placed in a document, a position in an interline space near a word or a phrase in an original document image on the basis of a position of the character recognized by the character recognizing component, wherein the position determining component further comprises,
      a phrase judging component configured to judge whether a phrase for which a supplementary annotation is obtained is a discontinuous phrase in which plural words included in the phrase are discontinuously placed in the document; and
      an annotation arrangement position determining component configured to determine, as a position at which the supplementary annotation should be placed in a document, a position in an interline space in the original document image near any one of a head word in a discontinuous phrase, a continuous word string included in the discontinuous phrase and the longest word in the discontinuous phrase, in the case that the phrase for which a supplementary annotation is obtained is the discontinuous phrase; and
   an image generator including a memory and processor configured to generate an image representing a supplementary annotation added document by superimposing a supplementary annotation text layer on an original document image layer configured from an original document image, the supplementary annotation text layer including each supplementary annotation placed at a position corresponding to a position determined in the original document image by the position determining component.

2. The document image generation apparatus according to claim 1, wherein
   the image generator further superimposes a marked image layer on the original document image layer, and
   the marked image layer is configured from an image in which a mark indicating a discontinuous phrase is placed at a position corresponding to the position of a discontinuous phrase in the original document image.

3. The document image generation apparatus according to claim 1, further comprising:

an annotation addition object selector configured to select a word or a phrase at which a supplementary annotation should be placed, from words or phrases included in the document, wherein the position determining component further comprises:

an annotation length judging component configured to judge whether or not a length of a supplementary annotation is longer than a length of the word or phrase corresponding to the supplementary annotation;

an object front-back annotation addition judging component configured to judge whether or not another supplementary annotation should be placed at a word in front of or behind the word or phrase, in the case that the length of the supplementary annotation is longer than the length of the word or phrase corresponding to the supplementary annotation;

an annotation expended position determining component configured to determine, as a the position at which the supplementary annotation should be placed in the document, a position including a position in an interline space near the word or the phrase corresponding to the supplementary annotation and a position in an interline space near the word, either of the words in front of or behind the word or the phrase corresponding to the supplementary annotation, at which another supplementary annotation should not be placed, in the case that another supplementary annotation should not be placed at either one or both of the words in front of and behind the word or the phrase;

a front-back annotation length judging component configured to judge whether or not a length of said another supplementary annotation is shorter than a length which is obtained by subtraction of a predetermined length from a length of a word, either of the words in front of and behind the word or the phrase corresponding to the supplementary annotation, at which said another supplementary annotation should be placed, in the case that said another supplementary annotation should be placed at either one or both of the words in front of and behind the word or the phrase corresponding to the supplementary annotation;

an annotation partially expended position determining component configured to determine, as a position at which the supplementary annotation should be placed in the document, a position including a position in an interline space near the word or the phrase corresponding to the supplementary annotation and a part of a position in the interline space near a word, either of the words in front of and behind the word and the phrase, at which another supplementary annotation should be placed and whose length minus a predetermined length is longer than the length of said another supplementary annotation, in the case that the length of said another supplementary annotation is shorter than a length which is obtained by subtraction of the predetermined length from the length of the word at which said another supplementary annotation should be placed; and an annotation reduction rate calculator configured to calculate a reduction rate for reducing a length of a supplementary annotation which is longer than a length of a character string that can be placed at a position determined to be a position for placing the supplementary annotation in the documents.

4. The document image generation apparatus according to claim 1, wherein the image generator is configured to superimpose an original document text layer on the original document image layer, and in the original document text layer, text data indicating each character in the original document image is placed in a transparent state at a position corresponding to each character in the original document image.

5. The document image generation apparatus according to claim 1, wherein the supplementary annotation obtaining component is configured to obtain a translation for a word or a phrase, a reading for the word or the phrase or an annotation for the word or the phrase as the supplementary annotation.

6. The document image generation apparatus according to claim 1, wherein the supplementary annotation obtaining component is configured to perform a natural language processing on contents of a document configured from character strings of each line connected with one another in order of lines, the character strings are configured from characters recognized by the character recognizing component.

7. The document image generation apparatus according to claim 1, further comprising:

a receiver configured to receive data for a web page sent from an external apparatus; and a display configured to display a web page based on the data received by the receiver, wherein the original document image obtaining component comprises a web-page obtaining component configured to obtain a web page as an original document image.

8. A document image generation apparatus that generates, on the basis of an image representing a document including plural lines, an image representing a supplementary annotation added document in which a supplementary annotation corresponding to a word or a phrase composed of plural words included in the document is added, comprising:

a controller configured to obtain an original document image representing a document, wherein the controller is configured to obtain the original document image from a scanner, and wherein further the document is a text document, wherein the controller is further configured to:

recognize a character included in the obtained document image and identifying a position of the character in the original document image;

determine a meaning of a word or a phrase included in the document constructed of a plurality of the recognized characters through a natural language processing performed on the document, and obtain a supplementary annotation corresponding to the meaning of each word or phrase;

determine, as a position at which the obtained supplementary annotation corresponding to each word or phrase should be placed in a document, a position in an interline space near a word or a phrase in an original document image on the basis of a position of the recognized character;

generate an image representing a supplementary annotation added document by superimposing a supplementary annotation text layer on an original document image layer configured from an original document image, the supplementary annotation text layer including each supplementary annotation placed at a position corresponding to the determined position in the original document image;

judge whether a phrase for which a supplementary annotation is obtained is a discontinuous phrase in which plural words included in the phrase are discontinuously placed in the document; and determine, as a position at which a supplementary annotation should be placed in a document, a position in an interline space in the original document image near any one of a head word in a discontinuous phrase, a continuous word string included in the discontinuous phrase and the longest word in the discontinuous phrase, in the case that the phrase for which a supplementary annotation is obtained is the discontinuous phrase.

9. The document image generation apparatus according to claim 8, wherein
the controller is further configured to superimpose a marked image layer on the original document image layer, and
the marked image layer is configured from an image in which a mark indicating a discontinuous phrase is placed at a position corresponding to the position of a discontinuous phrase in the original document image.

10. The document image generation apparatus according to claim 8, wherein the controller is further configured to:
select a word or a phrase at which a supplementary annotation should be placed, from words or phrases included in the document;
judge whether or not a length of a supplementary annotation is longer than a length of the word or phrase corresponding to the supplementary annotation;
judge whether or not another supplementary annotation should be placed at a word in front of or behind the word or phrase, in the case that the length of the supplementary annotation is longer than the length of the word or phrase corresponding to the supplementary annotation;
determine as a position at which the supplementary annotation should be placed in the document, a position including a position in an interline space near the word or the phrase corresponding to the supplementary annotation and a position in an interline space near the either one of the words in front of and behind the word or the phrase corresponding to the supplementary annotation at which another supplementary annotation should not be placed, in the case that another supplementary annotation should not be placed at either one or both of the words in front of and behind the word or the phrase;
judge whether or not a length of said another supplementary annotation is shorter than a length which is obtained by subtraction of a predetermined length from a length of a word, either of the words in front of and behind the word or the phrase corresponding to the supplementary annotation, at which said another supplementary annotation should be placed, in the case that said another supplementary annotation should be placed at either one or both of the words in front of and behind the word or the phrase corresponding to the supplementary annotation;
determine, as a position at which the supplementary annotation should be placed in the document, a position including a position in an interline space near the word or the phrase corresponding to the supplementary annotation and a part of a position in an interline space near a word, either of the words in front of and behind the word and the phrase, at which another supplementary annotation should be placed and whose length minus the predetermined length is longer than the length of said another supplementary annotation, in the case that the length of said another supplementary annotation is shorter than a length which is obtained by subtraction of a predetermined length from the length of the word at which another supplementary annotation should be placed; and calculate a reduction rate for reducing a length of a supplementary annotation which is longer than a length of a character string that can be placed at a position determined to be a position for placing the supplementary annotation in the documents.

11. The document image generation apparatus according to claim 8, wherein the controller is further configured to superimpose an original document text layer on the original document image layer, and in the original document text layer, text data indicating each character in the original document image is placed in a transparent state at a position corresponding to each character in the original document image.

12. The document image generation apparatus according to claim 8, wherein the controller is further configured to obtain a translation for a word or a phrase, a reading for the word or the phrase or an annotation for the word or the phrase as the supplementary annotation.

13. The document image generation apparatus according to claim 8, wherein the controller is further configured to perform a natural language processing on contents of a document configured from character strings of each line connected with one another in order of lines, and the character strings are configured from the recognized characters.

14. The document image generation apparatus according to claim 8, further comprising:
a receiver configured to receive data for a web page sent from an external apparatus; and
a display configured to display a web page based on the data received by the receiver, wherein
the controller is further configured to obtain a web page as an original document image.

15. A document image generation method for generating an image representing a supplementary annotation added document on the basis of an image representing a document including plural lines, in which a supplementary annotation corresponding to a word or a phrase composed of plural words included in the document is added, the method comprising:
obtaining, from a scanner, an original document image representing a document, wherein the document is a text document;
recognizing a character included in the obtained document image and identifying a position of the character in the original document image;
determining a meaning of word or a phrase included in the document through a natural language processing performed on the document composed of a plurality of the recognized characters, and obtaining a supplementary annotation corresponding to the meaning of each word or phrase;
determining, as a position at which the obtained supplementary annotation corresponding to each word or phrase should be placed in a document, a position in an interline space near a word or phrase in an original document image on the basis of a position of the recognized character;
generating an image representing a supplementary annotation added document by superimposing a supplementary annotation text layer on an original document image layer configured from an original document image, the supplementary annotation text layer including each supplementary annotation placed at a position corresponding to the position determined in the original document image at the step of determining a position;
judging whether a phrase for which a supplementary annotation is obtained is a discontinuous phrase in which plural words included in the phrase are discontinuously placed in the document; and determining, as a position at which the supplementary annotation should be placed in a document, a position in an interline space in the original document image near any one of a head word in a discontinuous phrase, a continuous word string included in the discontinuous phrase and the longest word in the discontinuous phrase, in the case that the phrase for which a supplementary annotation is obtained is the discontinuous phrase.

16. A non-transitory computer-readable medium having computer-executable instructions embodied thereon for performing a method of processing for generating, on the basis of an image representing a document including plural lines, an image representing a supplementary annotation added document in which a supplementary annotation corresponding to a word or a phrase composed of plural words included in the document is added, the method comprising:

obtaining an original document image representing a document;

recognizing a character included in the obtained document image and identifying a position of the character in the original document image;

determining a meaning of a word or phrase included in the document through a natural language processing performed on the document composed of a plurality of the recognized characters, and obtaining a supplementary annotation corresponding to the meaning of each word or phrase;

determining a position in an interline space near a word or phrase in an original document image on the basis of a position of the recognized character, as a position at which the obtained supplementary annotation corresponding to each word or phrase should be placed in a document;

generating an image representing a supplementary annotation added document by superimposing a supplementary annotation text layer on an original document image layer configured from an original document image, the supplementary annotation text layer including each supplementary annotation placed at a position corresponding to the position in the original document image determined at the step of determining a position;

judging whether a phrase for which a supplementary annotation is obtained is a discontinuous phrase in which plural words included in the phrase are discontinuously placed in the document; and determining, as a position at which the supplementary annotation should be placed in a document, a position in an interline space in the original document image near any one of a head word in a discontinuous phrase, a continuous word string included in the discontinuous phrase and the longest word in the discontinuous phrase, in the case that the phrase for which a supplementary annotation is obtained is the discontinuous phrase.

* * * * *